United States Patent
Gottlieb

(10) Patent No.: US 10,542,237 B2
(45) Date of Patent: Jan. 21, 2020

(54) SYSTEMS AND METHODS FOR FACILITATING COMMUNICATIONS AMONGST MULTIPLE USERS

(71) Applicant: Shindig, Inc., New York, NY (US)

(72) Inventor: Steven M. Gottlieb, New York, NY (US)

(73) Assignee: Shindig, Inc., New York, NY (US)

(*) Notice: Subject to any disclaimer, the term of this patent is extended or adjusted under 35 U.S.C. 154(b) by 568 days.

(21) Appl. No.: 15/191,423

(22) Filed: Jun. 23, 2016

(65) Prior Publication Data

US 2016/0309116 A1    Oct. 20, 2016

Related U.S. Application Data

(60) Division of application No. 13/925,059, filed on Jun. 24, 2013, now Pat. No. 9,401,937, which is a
(Continued)

(51) Int. Cl.
*H04N 7/14* (2006.01)
*H04L 29/06* (2006.01)
(Continued)

(52) U.S. Cl.
CPC ......... *H04N 7/147* (2013.01); *G06K 9/00228* (2013.01); *G06K 9/00335* (2013.01);
(Continued)

(58) Field of Classification Search
CPC .......... H04N 7/147; H04N 7/15; H04L 67/22; H04L 67/24; G06K 9/00228; G06K 9/00335; G06K 9/00718; G06F 3/04812
See application file for complete search history.

(56) References Cited

U.S. PATENT DOCUMENTS

| 5,040,231 A | 8/1991 | Terzian |
| 5,612,716 A | 3/1997 | Chida |

(Continued)

FOREIGN PATENT DOCUMENTS

| CA | 2771785 | 3/2011 |
| CA | 2774014 | 4/2011 |

(Continued)

OTHER PUBLICATIONS

About TokBox, Inc., All about TokBox, http://www.tokbox.com/about, retrieved Feb. 4, 2011, p. 1.
(Continued)

*Primary Examiner* — Eric J. Bycer
(74) *Attorney, Agent, or Firm* — Robert W. Morris; Eckert Seamanns Cherin & Mellott, LLC

(57) ABSTRACT

A system can be provided that allows a user of a device to easily navigate through other users connected on a network. More particularly, the system can present or otherwise display indicators representing other users, and can allow a user of the device to manipulate (e.g., via scrolling, panning, gesturing, and the like) the display to traverse through the various indicators. In at least one embodiment, a level or a mode of communication between on the device and the devices represented by the indicators can be modified (e.g., upgraded or downgraded) depending on whether those indicators are currently being displayed in a display area of the device. This can simplify and maintain stability in the management of a large scale system of users.

16 Claims, 25 Drawing Sheets

Related U.S. Application Data continuation-in-part of application No. 13/849,696, filed on Mar. 25, 2013, now Pat. No. 9,041,768, which is a continuation of application No. 12/624,829, filed on Nov. 24, 2009, now Pat. No. 8,405,702.

(60) Provisional application No. 61/117,477, filed on Nov. 24, 8, provisional application No. 61/117,483, filed on Nov. 24, 2008, provisional application No. 61/145,107, filed on Jan. 15, 2009.

(51) Int. Cl.
| | |
|---|---|
| H04L 29/08 | (2006.01) |
| H04N 7/15 | (2006.01) |
| G06K 9/00 | (2006.01) |
| H04L 12/18 | (2006.01) |
| G06F 3/0488 | (2013.01) |
| G06F 3/0481 | (2013.01) |

(52) U.S. Cl.
CPC ........ *G06K 9/00718* (2013.01); *H04L 65/403* (2013.01); *H04L 67/22* (2013.01); *H04L 67/24* (2013.01); *H04N 7/15* (2013.01); *G06F 3/0488* (2013.01); *G06F 3/04812* (2013.01); *H04L 12/1813* (2013.01); *H04L 12/1822* (2013.01)

(56) References Cited

U.S. PATENT DOCUMENTS

| | | | |
|---|---|---|---|
| 5,847,709 | A | 12/1998 | Card |
| 6,044,146 | A | 3/2000 | Gisby et al. |
| 6,241,612 | B1 | 6/2001 | Heredia |
| 6,259,471 | B1 | 7/2001 | Peters et al. |
| 6,419,137 | B1 | 7/2002 | Marshall |
| 6,515,681 | B1 | 2/2003 | Knight |
| 6,559,863 | B1 | 5/2003 | Megiddo |
| 6,654,346 | B1 | 11/2003 | Mahalingaiah et al. |
| 6,697,614 | B2 | 2/2004 | Dorenbosch |
| 7,007,235 | B1 | 2/2006 | Hussein |
| 7,386,799 | B1 | 6/2008 | Clanton |
| 7,478,129 | B1 | 1/2009 | Chemtob |
| 7,487,211 | B2 | 2/2009 | Beavers et al. |
| 7,495,687 | B2 | 2/2009 | DuMas et al. |
| 7,515,560 | B2 | 4/2009 | DuMas et al. |
| 7,593,032 | B2 | 9/2009 | Civanlar et al. |
| 7,787,447 | B1 | 8/2010 | Egan et al. |
| 7,958,457 | B1 | 6/2011 | Brandenberg |
| 8,037,139 | B1 | 10/2011 | Fish |
| 8,060,560 | B2 | 11/2011 | Vonog et al. |
| 8,144,187 | B2 | 3/2012 | Moore et al. |
| 8,147,251 | B1 | 4/2012 | Anson |
| 8,171,154 | B2 | 5/2012 | Vonog et al. |
| 8,225,127 | B2 | 7/2012 | Vonog et al. |
| 8,230,355 | B1 | 7/2012 | Bauermeister |
| 8,390,670 | B1 | 3/2013 | Gottlieb |
| 8,405,702 | B1 | 3/2013 | Gottlieb |
| 8,429,704 | B2 | 4/2013 | Vonog et al. |
| 8,458,328 | B2 | 6/2013 | Dubovik et al. |
| 8,463,677 | B2 | 9/2013 | Vonog et al. |
| 8,527,654 | B2 | 9/2013 | Vonog et al. |
| 8,549,167 | B2 | 10/2013 | Vonog et al. |
| 8,558,868 | B2 | 10/2013 | Prentice |
| 8,635,293 | B2 | 1/2014 | Fisher |
| 8,647,206 | B1 | 2/2014 | Gottlieb |
| 8,749,610 | B1 | 6/2014 | Gossweiler |
| 8,779,265 | B1 | 7/2014 | Gottlieb |
| 8,902,272 | B1 | 12/2014 | Gottlieb |
| 8,917,310 | B2 | 12/2014 | Gottlieb |
| 8,929,516 | B2 | 1/2015 | Odinak |
| 9,215,412 | B2 | 12/2015 | Gottlieb |
| 9,241,131 | B2 | 1/2016 | Desai |
| 2002/0094831 | A1 | 7/2002 | Maggenti et al. |
| 2002/0102999 | A1 | 8/2002 | Maggenti et al. |
| 2002/0143877 | A1 | 10/2002 | Hackbarth |
| 2002/0165921 | A1 | 11/2002 | Sapieyevski |
| 2002/0169014 | A1 | 11/2002 | Egozy et al. |
| 2003/0000369 | A1 | 1/2003 | Funaki |
| 2003/0014262 | A1 | 1/2003 | Kim |
| 2003/0097385 | A1 | 5/2003 | Lee et al. |
| 2003/0164084 | A1 | 9/2003 | Redmann et al. |
| 2004/0022202 | A1 | 2/2004 | Yang |
| 2004/0201668 | A1 | 10/2004 | Matsubara et al. |
| 2004/0255253 | A1 | 12/2004 | Marcjan |
| 2005/0032539 | A1 | 2/2005 | Noel et al. |
| 2005/0034076 | A1 | 2/2005 | Belhumeur et al. |
| 2005/0078613 | A1 | 4/2005 | Covell et al. |
| 2005/0132288 | A1 | 6/2005 | Kim et al. |
| 2005/0143135 | A1 | 6/2005 | Brems et al. |
| 2005/0210416 | A1 | 9/2005 | MacLaurin et al. |
| 2005/0262542 | A1 | 11/2005 | DeWeese et al. |
| 2006/0002315 | A1 | 1/2006 | Theurer |
| 2006/0031776 | A1 | 2/2006 | Glein et al. |
| 2006/0055771 | A1 | 3/2006 | Kies |
| 2006/0063555 | A1 | 3/2006 | Robbins |
| 2006/0112814 | A1 | 6/2006 | Paepcke |
| 2006/0114314 | A1 | 6/2006 | Dunko |
| 2006/0140138 | A1 | 6/2006 | Hill |
| 2007/0039449 | A1 | 2/2007 | Redmann |
| 2007/0078931 | A1 | 4/2007 | Ludwig |
| 2007/0121530 | A1 | 5/2007 | Vadlakonda |
| 2007/0140510 | A1 | 6/2007 | Redmann |
| 2007/0168426 | A1 | 7/2007 | Ludwig et al. |
| 2007/0186171 | A1 | 8/2007 | Junozovic |
| 2007/0201809 | A1 | 8/2007 | Karaoguz |
| 2007/0229652 | A1 | 10/2007 | Center et al. |
| 2007/0234220 | A1 | 10/2007 | Khan |
| 2007/0255816 | A1 | 11/2007 | Quackenbush et al. |
| 2007/0265074 | A1 | 11/2007 | Akahori et al. |
| 2008/0002668 | A1 | 1/2008 | Asokan et al. |
| 2008/0037763 | A1 | 2/2008 | Shaffer et al. |
| 2008/0120560 | A1 | 5/2008 | Cohen et al. |
| 2008/0136895 | A1 | 6/2008 | Mareachen |
| 2008/0136898 | A1 | 6/2008 | Eisenberg et al. |
| 2008/0137559 | A1 | 6/2008 | Sasaki et al. |
| 2008/0146339 | A1 | 6/2008 | Olsen et al. |
| 2008/0181260 | A1 | 7/2008 | Vonog et al. |
| 2008/0190271 | A1 | 8/2008 | Taub et al. |
| 2008/0232248 | A1 | 9/2008 | Barave et al. |
| 2008/0274810 | A1 | 11/2008 | Hayashi et al. |
| 2009/0024963 | A1 | 1/2009 | Lindley et al. |
| 2009/0033737 | A1 | 2/2009 | Goose et al. |
| 2009/0036108 | A1 | 2/2009 | Cho |
| 2009/0037826 | A1 | 2/2009 | Bennetts |
| 2009/0040289 | A1 | 2/2009 | Hetherington et al. |
| 2009/0054107 | A1 | 2/2009 | Feland, III et al. |
| 2009/0058984 | A1 | 3/2009 | Lee |
| 2009/0070420 | A1 | 3/2009 | Quackenbush |
| 2009/0172200 | A1 | 7/2009 | Morrison et al. |
| 2009/0186605 | A1 | 7/2009 | Apfel et al. |
| 2009/0204906 | A1 | 8/2009 | Irving |
| 2009/0209339 | A1 | 8/2009 | Okada |
| 2009/0210789 | A1 | 8/2009 | Thakkar |
| 2009/0249244 | A1 | 10/2009 | Robinson et al. |
| 2009/0254843 | A1 | 10/2009 | Van Wie |
| 2009/0257730 | A1 | 10/2009 | Chen |
| 2009/0288007 | A1 | 11/2009 | Leacock |
| 2010/0005411 | A1 | 1/2010 | Duncker |
| 2010/0010890 | A1 | 1/2010 | Ditkovski et al. |
| 2010/0026780 | A1 | 2/2010 | Tico et al. |
| 2010/0026802 | A1 | 2/2010 | Titus et al. |
| 2010/0030578 | A1 | 2/2010 | Siddique et al. |
| 2010/0122184 | A1 | 5/2010 | Vonog et al. |
| 2010/0130868 | A1 | 5/2010 | Chawla |
| 2010/0146085 | A1 | 6/2010 | Van Wie |
| 2010/0165904 | A1 | 7/2010 | Woodward et al. |
| 2010/0198992 | A1 | 8/2010 | Morrison et al. |
| 2010/0211872 | A1 | 8/2010 | Rolston et al. |
| 2010/0258474 | A1 | 10/2010 | Liu |
| 2010/0316232 | A1 | 12/2010 | Acero et al. |
| 2011/0010146 | A1 | 1/2011 | Buskies et al. |
| 2011/0011244 | A1 | 1/2011 | Homburg |

(56) References Cited

U.S. PATENT DOCUMENTS

| | | |
|---|---|---|
| 2011/0055317 A1 | 3/2011 | Vonog et al. |
| 2011/0060992 A1 | 3/2011 | Jevons |
| 2011/0072366 A1 | 3/2011 | Spencer et al. |
| 2011/0078532 A1 | 3/2011 | Vonog et al. |
| 2011/0164141 A1 | 7/2011 | Tico et al. |
| 2011/0179180 A1 | 7/2011 | Schleifer et al. |
| 2011/0185286 A1 | 7/2011 | Moyers |
| 2011/0209104 A1 | 8/2011 | Hinckley et al. |
| 2011/0270922 A1 | 11/2011 | Jones |
| 2011/0279634 A1 | 11/2011 | Periyannan |
| 2012/0038550 A1 | 2/2012 | Lemmey et al. |
| 2012/0039382 A1 | 2/2012 | Vonog et al. |
| 2012/0041859 A1 | 2/2012 | Vonog et al. |
| 2012/0060101 A1 | 3/2012 | Vonog et al. |
| 2012/0084456 A1 | 4/2012 | Vonog et al. |
| 2012/0084672 A1 | 4/2012 | Vonog et al. |
| 2012/0084682 A1 | 4/2012 | Sirpal |
| 2012/0098919 A1 | 4/2012 | Tang |
| 2012/0110162 A1 | 5/2012 | Dubovik et al. |
| 2012/0110163 A1 | 5/2012 | Dubovik et al. |
| 2012/0124128 A1 | 5/2012 | Vonog et al. |
| 2012/0127183 A1 | 5/2012 | Vonog et al. |
| 2012/0151541 A1 | 6/2012 | Vonog et al. |
| 2012/0182384 A1 | 7/2012 | Anderson |
| 2012/0192087 A1 | 7/2012 | Lemmey |
| 2012/0198334 A1 | 8/2012 | Surin et al. |
| 2012/0246227 A1 | 9/2012 | Vonog et al. |
| 2012/0002001 A1 | 10/2012 | Prentice |
| 2012/0249719 A1 | 10/2012 | Lemmey et al. |
| 2012/0254649 A1 | 10/2012 | Vonog et al. |
| 2012/0272162 A1 | 10/2012 | Surin et al. |
| 2012/0280905 A1 | 11/2012 | Vonog et al. |
| 2012/0293600 A1 | 11/2012 | Lemmey et al. |
| 2012/0297320 A1 | 11/2012 | Lemmey et al. |
| 2012/0326866 A1 | 12/2012 | Lemmey et al. |
| 2012/0331089 A1 | 12/2012 | Vonog et al. |
| 2012/0331387 A1 | 12/2012 | Lemmey et al. |
| 2012/0331405 A1 | 12/2012 | Eidelson et al. |
| 2013/0014027 A1 | 1/2013 | Lemmey |
| 2013/0014028 A1 | 1/2013 | Lemmey et al. |
| 2013/0018960 A1 | 1/2013 | Knysz et al. |
| 2013/0019184 A1 | 1/2013 | Vonog et al. |
| 2013/0021431 A1 | 1/2013 | Lemmey et al. |
| 2013/0024785 A1 | 1/2013 | Van Wie |
| 2013/0063542 A1 | 3/2013 | Bhat |
| 2013/0073978 A1 | 3/2013 | Butler |
| 2013/0088518 A1 | 4/2013 | Lemmey et al. |
| 2013/0097512 A1 | 4/2013 | Hong et al. |
| 2013/0102854 A1 | 4/2013 | Zheng et al. |
| 2013/0109302 A1 | 5/2013 | Levien et al. |
| 2013/0115582 A1 | 5/2013 | el Kaliouby et al. |
| 2013/0121503 A1 | 5/2013 | Ankolekar et al. |
| 2013/0123019 A1 | 5/2013 | Sullivan |
| 2013/0151333 A1 | 6/2013 | el Kaliouby et al. |
| 2013/0156093 A1 | 6/2013 | Vonog et al. |
| 2013/0169742 A1 | 7/2013 | Wu |
| 2013/0173531 A1 | 7/2013 | Rinearson |
| 2013/0191479 A1 | 7/2013 | Gottlieb |
| 2013/0201279 A1 | 8/2013 | Civinlar et al. |
| 2013/0216206 A1 | 8/2013 | Dubin |
| 2013/0239063 A1 | 9/2013 | Ubillos et al. |
| 2013/0254287 A1 | 9/2013 | Biswas |
| 2013/0289983 A1 | 10/2013 | Park |
| 2013/0321648 A1 | 12/2013 | Tamya |
| 2014/0004496 A1 | 1/2014 | Reddy |
| 2014/0019882 A1 | 1/2014 | Chew et al. |
| 2014/0033900 A1 | 2/2014 | Chapman et al. |
| 2014/0040784 A1 | 2/2014 | Behforooz et al. |
| 2014/0051047 A1 | 2/2014 | Bender et al. |
| 2014/0058828 A1 | 2/2014 | el Kaliouby et al. |
| 2014/0154659 A1 | 6/2014 | Otwell |
| 2014/0184723 A1 | 7/2014 | Morrison |
| 2014/0201207 A1 | 7/2014 | Sadowsky et al. |
| 2014/0229866 A1 | 8/2014 | Gottlieb |
| 2014/0229888 A1 | 8/2014 | Ko et al. |
| 2014/0325428 A1 | 10/2014 | Lee et al. |
| 2015/0046800 A1 | 2/2015 | Isidore et al. |
| 2015/0052453 A1 | 2/2015 | Yu et al. |
| 2015/0106750 A1 | 4/2015 | Konami |

FOREIGN PATENT DOCUMENTS

| | | |
|---|---|---|
| EP | 0721726 | 12/2000 |
| EP | 2471221 | 7/2012 |
| EP | 2484091 | 8/2012 |
| EP | 2630630 | 8/2013 |
| EP | 2636194 | 9/2013 |
| GB | 2446529 | 8/2008 |
| WO | 2009077936 | 6/2009 |
| WO | 2011025989 | 3/2011 |
| WO | 2011041229 | 4/2011 |
| WO | 2012021173 | 2/2012 |
| WO | 2012021174 | 2/2012 |
| WO | 2012021901 | 2/2012 |
| WO | 2012054089 | 4/2012 |
| WO | 2012054895 | 4/2012 |
| WO | 2012060977 | 5/2012 |
| WO | 2012060978 | 5/2012 |
| WO | 2012103376 | 8/2012 |
| WO | 2012135384 | 10/2012 |
| WO | 2012151471 | 11/2012 |
| WO | 2012177641 | 12/2012 |
| WO | 2012177779 | 12/2012 |
| WO | 2013343207 | 3/2013 |
| WO | 2013149079 | 10/2013 |

OTHER PUBLICATIONS

CrunchBase Profile, CrunchBase readeo, http://www.crunchbase.com/company/readeo, retrieved Feb. 3, 2011, pp. 1-2.

CrunchBase Profile, CrunchBase Rounds, http://www.crunchbase.com/company/6rounds, retrieved Feb. 4, 2011, pp. 1-2.

CrunchBase Profile, CrunchBase TokBox, http://www.crunchbase.com/company/tokbox, retrieved Feb. 4, 2011, pp. 1-3.

Online Collaboration GoToMeeting, http://www.gotomeeting.com/fec/online_collaboration, retrieved Feb. 4, 2011, pp. 1-4.

Readeo Press Release, http://www.mmpublicity.com, Feb. 25, 2010, pp. 1-2.

Rounds.com, Make friends online and enjoy free webcame chats, http://www.rounds.com/about, retrieved Feb. 4, 2011, pp. 1-3.

2011 Blackboard Collaborate User's Guide.

2007 WebEx Meeting Center User's Guide.

MacDonald, Heidi—Shindig Offers Authors Interactive Video Conferencing—Blog posted Sep. 12, 2012—Publishers Weekly. Retrieved from [http://publishersweekly.com] on [Aug. 15, 2016]. 5 Pages.

Shindig, Various Informational Pages Published as of Jul. 21, 2012—Retrieved via Internet Archive from [http://shindigevents.com] on [Aug. 5, 2016].

Slideshare—Shindig Magazine Video Chat Events. Slide Presentation published Oct. 9, 2012. Retrieved from [http://slideshart.net] on [Aug. 11, 2016]. 11 Pages.

Miyoshi et al. "Input device using eye tracker in human-computer interactions," Robot and Human Interactive Communcation, 2001 Proceedings, 10th IEEE International, pp. 580-585.

Robin Wauters, "6rounds Launches Video Communication Platform With Several Layers of Fun," TechCrunch, Jun. 30, 2009, pp. 1-2, http://techcrunch.com/2009/06/30/6rounds-launches-video-communication-platform-with-several-layers-of-fun/, accessed on Feb. 10, 2010.

"6rounds has officially launched!" 6rounds.com Blog, Jul. 3, 2009, pp. 1-4, http://blog.6rounds.com/official-launch-video-chat-website/, accessed on Feb. 10, 2010.

"The Gix00 Team on TV!" 6rounds.com Blog, Sep. 22, 2008, pp. 1-4, http://blog.6rounds.com/gixoo-tv-coverage-startup-factory/, accessed on Feb. 10, 2010.

Ustream Profile, Ustream, http://www.ustream.tv/help, retrieved Jul. 11, 2014, pp. 1-3.

(56) References Cited

OTHER PUBLICATIONS

Cisco, "Audio Controls Guide and Release Notes for FR29," Cisco WebEx User Guide, pp. 1-11.

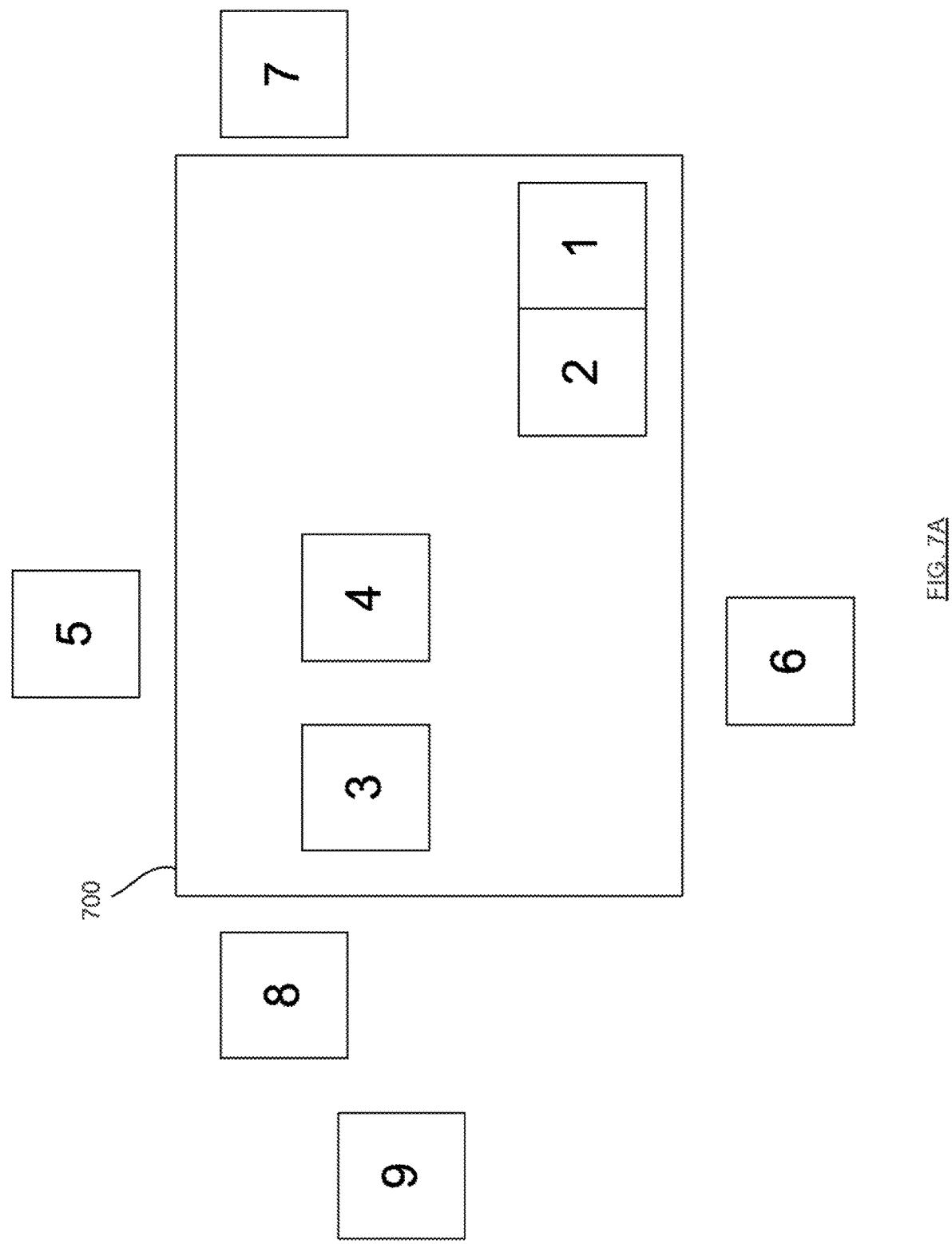

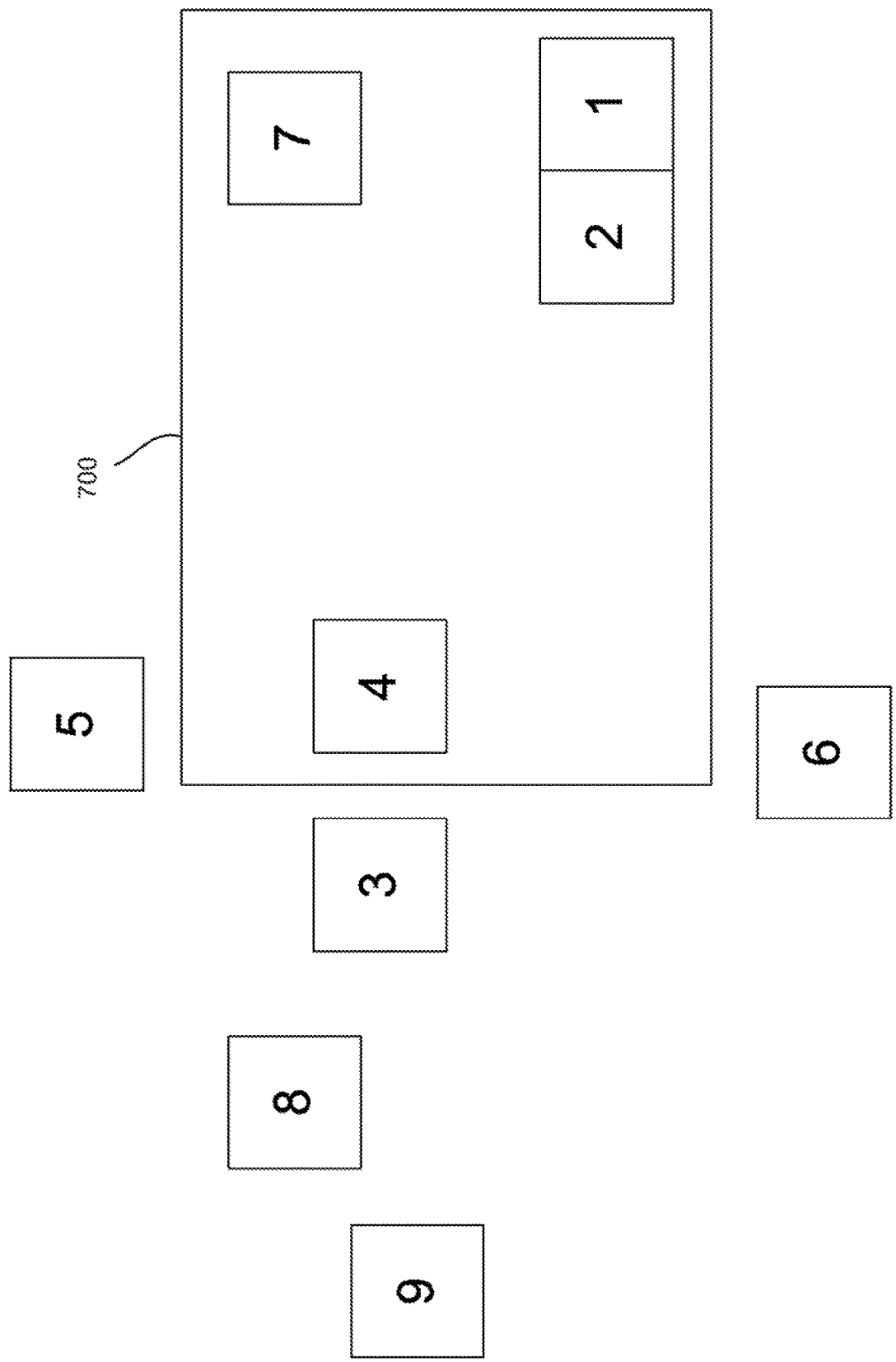

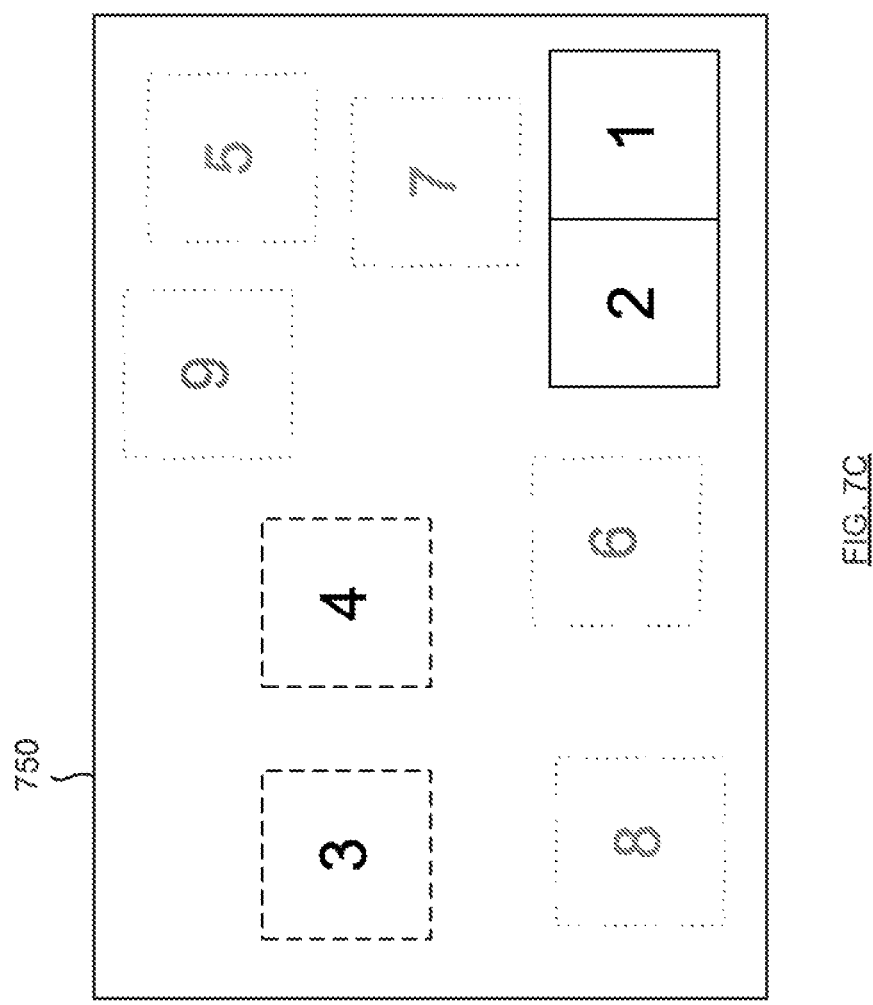

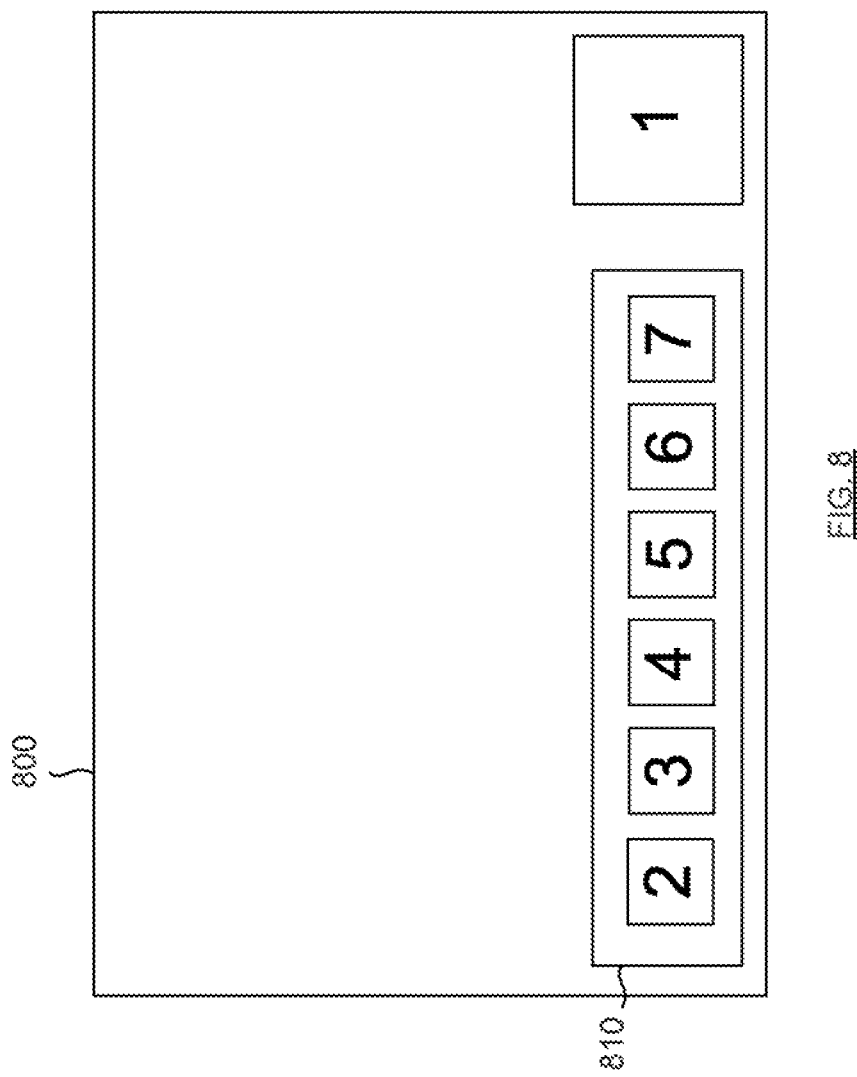

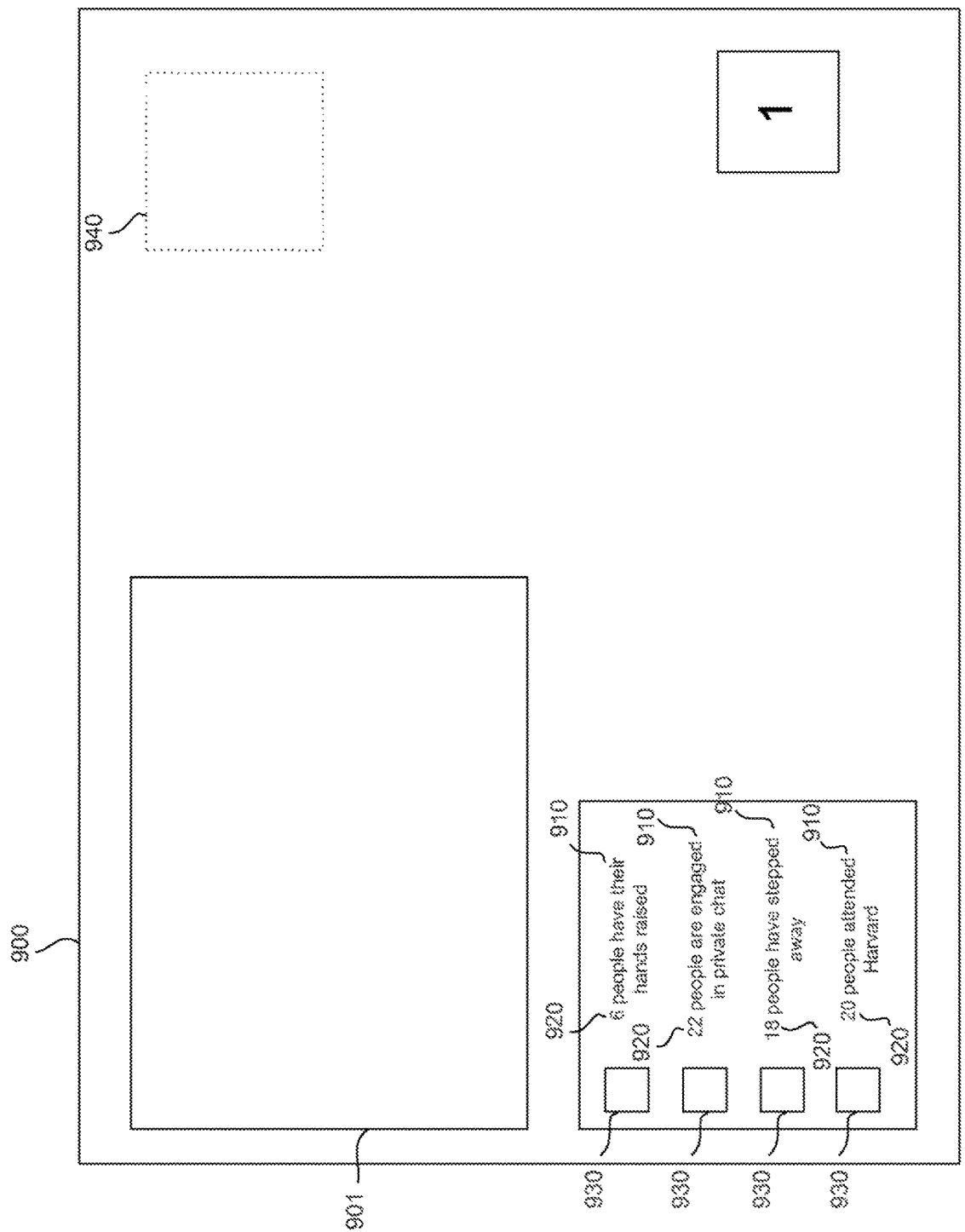

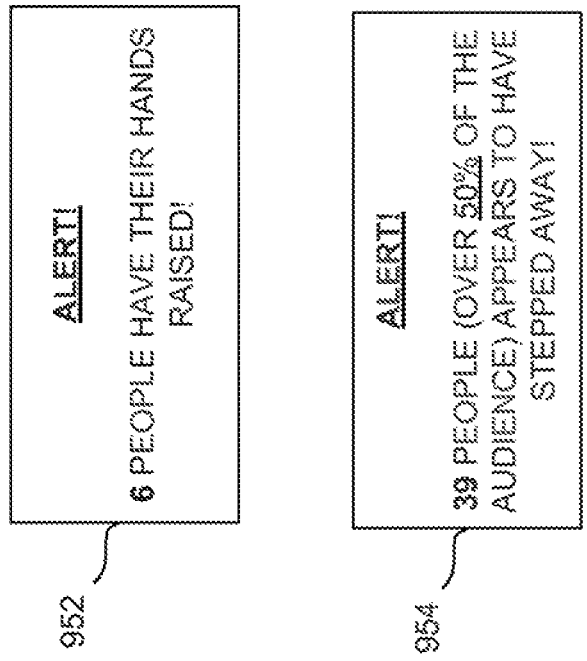

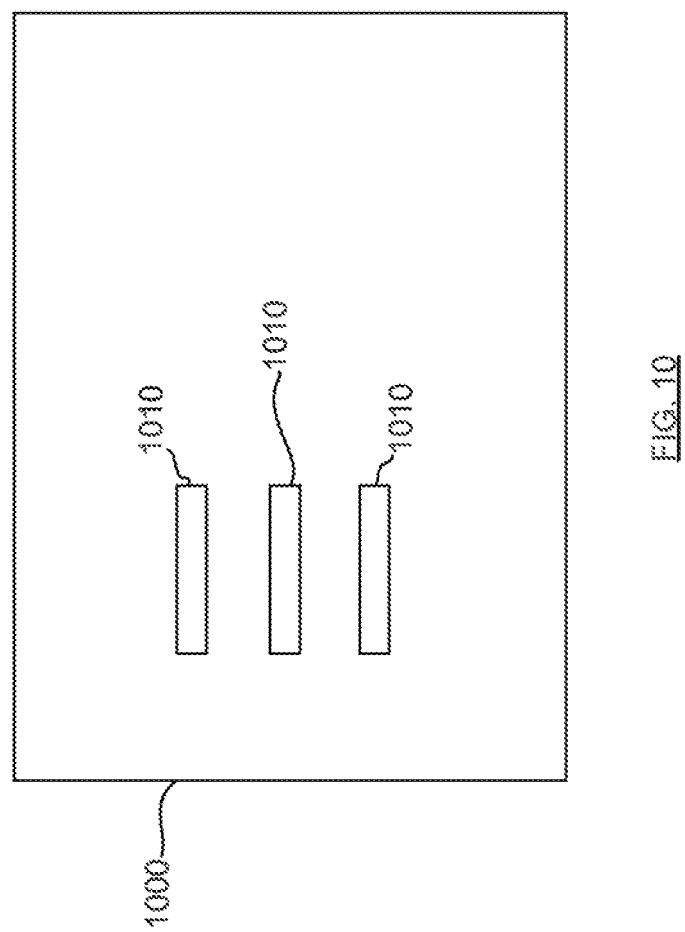

SYSTEMS AND METHODS FOR FACILITATING COMMUNICATIONS AMONGST MULTIPLE USERS

CROSS-REFERENCE TO RELATED APPLICATIONS

This application is a divisional of U.S. patent application Ser. No. 13/925,059, filed on Jun. 24, 2013 (Now U.S. Pat. No. 9,401,937), which is a continuation-in-part of U.S. patent application Ser. No. 13/849,696, filed on Mar. 25, 2013, which is a continuation of U.S. patent application Ser. No. 12/624,829, filed Nov. 24, 2009 (now U.S. Pat. No. 8,405,702), which claims the benefit of U.S. Provisional Patent Application Nos. 61/117,477, filed Nov. 24, 2008, 61/117,483, filed Nov. 24, 2008, and 61/145,107, filed Jan. 15, 2009. The disclosures of these applications are incorporated by reference herein in their entireties.

BACKGROUND OF THE INVENTION

Remote communication platforms (e.g., video chat platforms) have become increasingly popular over the past few years. As technology continues to advance, the capabilities provided by these platforms continue to grow. Nowadays, not only can a platform allow multiple users to communicate with one another in virtual groups or chatrooms, it can also be leveraged to host online events or presentations to a remote audience. For example, more and more classes are being held online in the form of massive open online courses ("MOOCs").

The popularity of these platforms can pose various problems, however. For example, as the popularity of a platform increases, it can be difficult for the platform to efficiently manage a large scale network of users. It can also be difficult to present a large sea of users or participants that a user of a device can easily identify, view, or otherwise grasp. Moreover, whereas, a host (those in the audience) of a live in-person event can typically assess or gauge the behavior, reaction, or other characteristics of the other participants, current platforms do not efficiently or effectively provide hosts or those in the audience with this same ability.

SUMMARY OF THE INVENTION

This relates to systems, methods, and devices for facilitating communications amongst multiple users.

As explained above, as the number of users increases, it can be difficult for the platform to efficiently manage the large scale network, as well as for users to easily grasp the extensity of the network on their devices. Thus, in at least one embodiment, a system can be provided that allows a user of a device to easily navigate through other users connected on a network. More particularly, the system can present or otherwise display indicators representing other users, and can allow a user of the device to manipulate (e.g., via scrolling, panning, gesturing, and the like) the display to traverse through the various indicators. In at least one embodiment, a level or a mode of communication between on the device and the devices represented by the indicators can be modified (e.g., upgraded or downgraded) depending on whether those indicators are currently being displayed in a display area of the device. This can simplify and maintain stability in the management of a large scale system of users.

Additionally, in at least one embodiment, a system can be provided to allow participants (e.g., the host, the audience, etc.) in a large scale event or presentation to easily identify other participants based on exhibited behaviors, reactions, or other characteristics. More particularly, the system can be configured to evaluate or analyze communication streams (e.g., webcam streams including video and/or audio of participants) that may be facilitated amongst user devices during networked communications, and categorize the participants into groups based on the evaluation. The system can also provide this categorization information to one or more of the participants to allow the participants to generally assess the environment of the event (e.g., similar to what one in a live in-person event may be able to do).

In some embodiments, a method for dynamically displaying a plurality of indicators is provided. The plurality of indicators each represents a respective user. The method includes displaying a first group of the plurality of indicators on a display of a device. The device is in communication with a first group of users in a first mode and with a second group of users in a second mode. The first group of users is represented by the first group of indicators, and the second group of users being represented by a second group of the plurality of indicators. The method also includes adjusting the display to display the second group of indicators based on receiving an instruction from a user, and changing the communication mode between the device and the second group of users from the second mode to the first mode based on the received instruction.

In some embodiments, a system for dynamically displaying a plurality of indicators using a device is provided. The plurality of indicators each represents a respective user. The system includes an input component configured to receive user instructions, a display configured to display indicators, and a communication component configured to communicate with external devices. The system also includes a processor configured to instruct the display to display a first group of the plurality of indicators. The processor is also configured to direct the communication component to communicate with a first group of users represented by the first group of indicators in a first mode, and communicate with a second group of users represented by a second group of the plurality of indicators in a second mode. The processor is also configured to instruct the display to display the second group of indicators based a received user instruction, and direct the communication component to communicate with the second group of users in the first mode based on the received instruction.

In some embodiments, a method for dynamically categorizing a plurality of users in a multi-user event is provided. The method includes receiving a plurality of media streams, each of the plurality of media streams corresponding to a respective one of the plurality of users. The method also includes assessing the plurality of media streams, categorizing the plurality of users into a plurality of groups based on the assessment, and facilitating communications between a presenter and each of the plurality of groups.

In some embodiments, a system for dynamically categorizing a plurality of users in a multi-user event is provided. The system includes a receiver configured to receive a plurality of media streams, each of the plurality of media streams corresponding to a respective one of the plurality of users. The system also includes a processor configured to assess the plurality of media streams, categorize the plurality of users into a plurality of groups based on the assessment, and facilitate communications between a presenter and each of the plurality of groups.

In some embodiments, a method for providing a call-to-action to an audience in a multi-user event is provided. The method includes facilitating presentation of content to a plurality of audience devices, and receiving an instruction during facilitating to set a call-to-action, the call-to-action requesting at least one input from a respective user of each of the plurality of audience devices. The method also includes transmitting the call-to-action to each of the plurality of audience devices.

In some embodiments, a system for providing a call-to-action to an audience in a multi-user event is provided. The system includes a communication component configured to communicate with external devices, and an input component configured to receive user instructions. The system also includes a processor configured to control the communication component to present content to a plurality of audience devices, and, during presenting the content, receiving from the input component a user instruction to set a call-to-action, the call-to-action requesting at least one input from a respective user of each of the plurality of audience devices. The processor is also configured to instruct the communication component to transmit the call-to-action to each of the plurality of audience devices.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 7A is a schematic view of an illustrative display screen displaying indicators representing users on a network, in accordance with at least one embodiment;

FIG. 7B is another schematic view of the illustrative display screen of FIG. 7A, in accordance with at least one embodiment;

FIG. 7C is a schematic view of another illustrative display screen displaying indicators representing users on a network, in accordance with at least one embodiment;

FIG. 8 is a schematic view of an illustrative array of indicators, in accordance with at least one embodiment;

FIG. 9A is a schematic view of an illustrative screen that includes one or more categorized groups of users in an audience, in accordance with at least one embodiment;

FIG. 9B shows various alerts that can be presented to a presenter on a screen, such as the screen of FIG. 9A, in accordance with at least one embodiment;

FIG. 10 shows an illustrative call-to-action window, in accordance with at least one embodiment;

DETAILED DESCRIPTION

Figure 1:
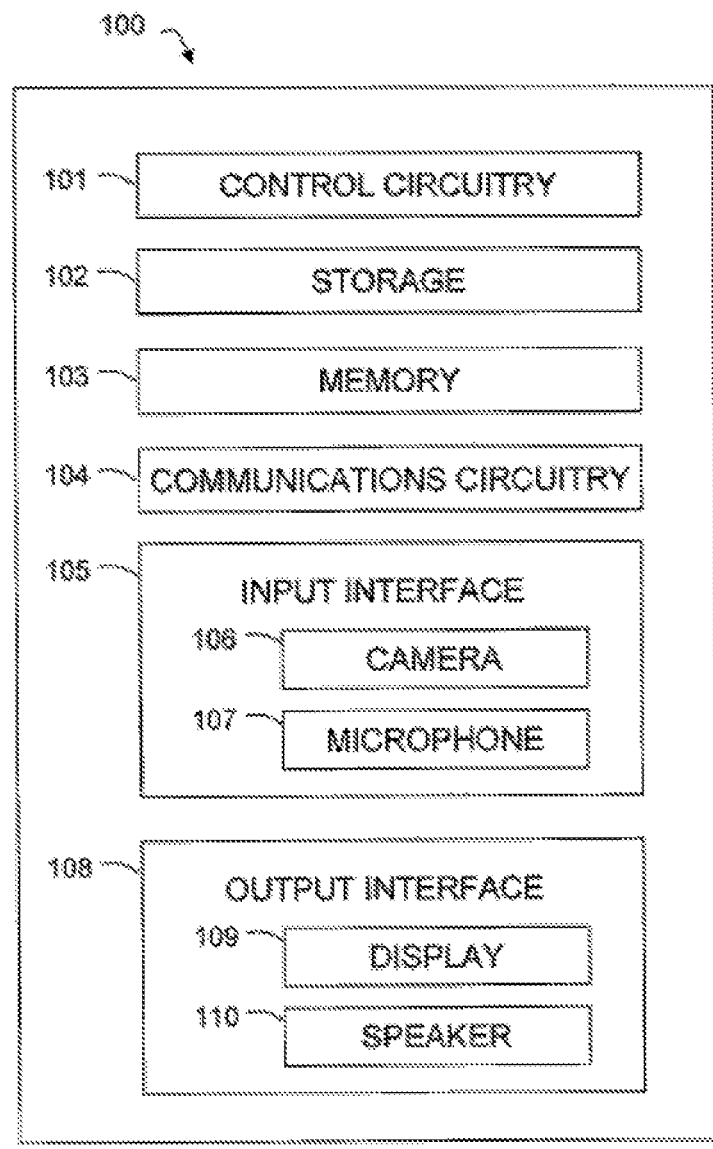
FIG. 1 is a block diagram of an illustrative user device, in accordance with at least one embodiment.

In accordance with at least one embodiment, users can interact with one another via user devices. For example, each user can interact with other users via a respective user device. FIG. 1 is a schematic view of an illustrative user device. User device 100 can include a control circuitry 101, a storage 102, a memory 103, a communications circuitry 104, an input interface 105, and an output interface 108. In at least one embodiment, one or more of the components of user device 100 can be combined or omitted. For example, storage 102 and memory 103 can be combined into a single mechanism for storing data. In at least another embodiment, user device 100 can include other components not shown in FIG. 1, such as a power supply (e.g., a battery or kinetics) or a bus. In yet at least another embodiment, user device 100 can include several instances of one or more components shown in FIG. 1.

User device 100 can include any suitable type of electronic device operative to communicate with other devices. For example, user device 100 can include a personal computer (e.g., a desktop personal computer or a laptop personal computer), a portable communications device (e.g., a cellular telephone, a personal e-mail or messaging device, a pocket-sized personal computer, a personal digital assistant (PDA)), or any other suitable device capable of communicating with other devices.

Control circuitry 101 can include any processing circuitry or processor operative to control the operations and performance of user device 100. Storage 102 and memory 103 can be combined, and can include one or more storage mediums or memory components.

Communications circuitry 104 can include any suitable communications circuitry capable of connecting to a communications network, and transmitting and receiving communications (e.g., voice or data) to and from other devices within the communications network. Communications circuitry 104 can be configured to interface with the communications network using any suitable communications protocol. For example, communications circuitry 104 can employ Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen®, LTE or any other suitable cellular network or protocol), infrared, TCP/IP (e.g., any of the protocols used in each of the TCP/IP layers), HTTP, BitTorrent®, FTP, RTP, RTSP, SSH, Voice over IP (VOIP), any other communications protocol, or any combination thereof. In at least one embodiment, communications circuitry 104 can be configured to provide wired communications paths for user device 100.

Input interface 105 can include any suitable mechanism or component capable of receiving inputs from a user. In at least one embodiment, input interface 105 can include a camera 106 and a microphone 107. Input interface 105 can also include a controller, a joystick, a keyboard, a mouse, any other suitable mechanism for receiving user inputs, or any combination thereof. Input interface 105 can also include circuitry configured to at least one of convert, encode, and decode analog signals and other signals into digital data. One or more mechanisms or components in input interface 105 can also be electrically coupled with control circuitry 101, storage 102, memory 103, communications circuitry 104, any other suitable components within device 100, or any combination thereof.

Camera 106 can include any suitable component capable of detecting images. For example, camera 106 can detect single pictures or video frames. Camera 106 can include any suitable type of sensor capable of detecting images. In at least one embodiment, camera 106 can include a lens, one or more sensors that generate electrical signals, and circuitry that processes the generated electrical signals. These sensors can, for example, be provided on a charge-coupled device (CCD) integrated circuit. Camera 106 can be electrically coupled with control circuitry 101, storage 102, memory 103, communications circuitry 104, any other suitable components within device 100, or any combination thereof.

Microphone 107 can include any suitable component capable of detecting audio signals. For example, microphone 107 can include any suitable type of sensor capable of detecting audio signals. In at least one embodiment, microphone 107 can include one or more sensors that generate electrical signals, and circuitry that processes the generated electrical signals. Microphone 107 can also be electrically coupled with control circuitry 101, storage 102, memory 103, communications circuitry 104, any other suitable components within device 100, or any combination thereof.

Output interface 108 can include any suitable mechanism or component capable of providing outputs to a user. In at least one embodiment, output interface 108 can include a display 109 and a speaker 110. Output interface 108 can also include circuitry configured to at least one of convert, encode, and decode digital data into analog signals and other signals. For example, output interface 108 can include circuitry configured to convert digital data into analog signals for use by an external display or speaker. Any mechanism or component in output interface 108 can be electrically coupled with control circuitry 101, storage 102, memory 103, communications circuitry 104, any other suitable components within device 100, or any combination thereof.

Display 109 can include any suitable mechanism capable of displaying visual content (e.g., images or indicators that represent data). For example, display 109 can include a thin-film transistor liquid crystal display (LCD), an organic liquid crystal display (OLCD), a plasma display, a surface-conduction electron-emitter display (SED), organic light-emitting diode display (OLED), or any other suitable type of display. Display 109 can be electrically coupled with control circuitry 101, storage 102, memory 103, any other suitable components within device 100, or any combination thereof. Display 109 can display images stored in device 100 (e.g., stored in storage 102 or memory 103), images captured by device 100 (e.g., captured by camera 106), or images received by device 100 (e.g., images received using communications circuitry 104). In at least one embodiment, display 109 can display communication images received by communications circuitry 104 from other devices (e.g., other devices similar to device 100). Display 109 can be electrically coupled with control circuitry 101, storage 102, memory 103, communications circuitry 104, any other suitable components within device 100, or any combination thereof.

Speaker 110 can include any suitable mechanism capable of providing audio content. For example, speaker 110 can include a speaker for broadcasting audio content to a general area (e.g., a room in which device 100 is located). As another example, speaker 110 can include headphones or earbuds capable of broadcasting audio content directly to a user in private. Speaker 110 can be electrically coupled with control circuitry 101, storage 102, memory 103, communications circuitry 104, any other suitable components within device 100, or any combination thereof.

Figure 2:
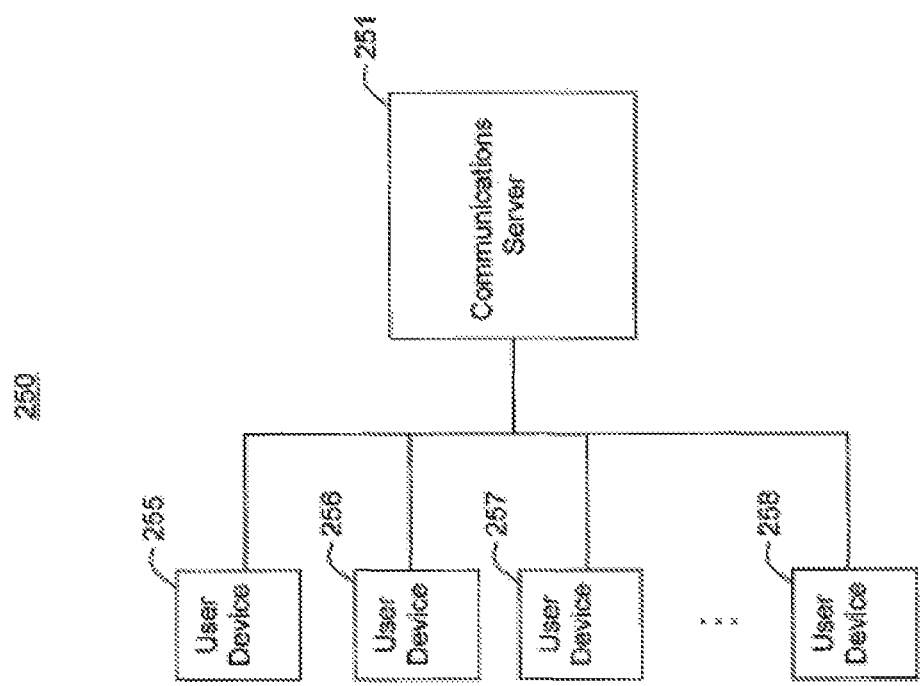
FIG. 2 is a schematic view of an illustrative communications system, in accordance with at least one embodiment.

In at least one embodiment, a communications system can include multiple user devices and a server. FIG. 2 is a schematic view of an illustrative communications system 250. Communications system 250 can facilitate communications amongst multiple users, or any subset thereof.

Communications system 250 can include at least one communications server 251. Communications server 251 can be any suitable server capable of facilitating communications between two or more users. For example, server 251 can include multiple interconnected computers running software to control communications.

Communications system 250 can also include several user devices 255-258. Each of user devices 255-258 can be substantially similar to user device 100 and the previous description of the latter can be applied to the former. Communications server 251 can be coupled with user devices 255-258 through any suitable network. For example, server 251 can be coupled with user devices 255-258 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen®, LTE or any other suitable cellular network or protocol), infrared, TCP/IP (e.g., any of the protocols used in each of the TCP/IP layers), HTTP, BitTorrent®, FTP, RTP, RTSP, SSH, Voice over IP (VOIP), any other communications protocol, or any combination thereof. In at least one embodiment, each user device can correspond to a single user. For example, user device 255 can correspond to a first user and user device 256 can correspond to a second user. Server 251 can facilitate communications between two or more of the user devices. For example, server 251 can control one-to-one communications between user device 255 and 256 and/or multi-party communications between user device 255 and user devices 256-258. Each user device can provide outputs to a user and receive inputs from the user when facilitating communications. For example, a user device can include an input interface (e.g., similar to input interface 105) capable of receiving communication inputs from a user and an output interface (e.g., similar to output interface 108) capable of providing communication outputs to a user.

In at least one embodiment, communications system 250 can be coupled with one or more other systems that provide additional functionality. For example, communications system 250 can be coupled with a video game system that provides video games to users communicating amongst each other through system 250. A more detailed description of such a game system can be found in U.S. Provisional Patent Application 61/145,107, which has been incorporated by reference herein in its entirety. As another example, communications system 250 can be coupled with a media system that provides media (e.g., audio, video, etc.) to users communicating amongst each other through system 250.

While only one communications server (e.g., server 251) and four communications user devices (e.g., devices 255-258) are shown in FIG. 2, it is to be understood that any number of servers and user devices can be provided.

Each user can have his own addressable user device through which the user communicates (e.g., devices 255-258). The identity of these user devices can be stored in a central system (e.g., communications server 250). The central system can further include a directory of all users and/or user devices. This directory can be accessible by or replicated in each device in the communications network.

The user associated with each address can be displayed via a visual interface (e.g., an LCD screen) of a device. Each user can be represented by a video, picture, graphic, text, any other suitable identifier, or any combination thereof. If there is limited display space, a device can limit the number of users displayed at a time. For example, the device can include a directory structure that organizes all the users. As another example, the device can include a search function, and can accept search queries from a user of that device.

As described above, multiple communications media can be supported. Accordingly, a user can choose which communications medium to use when initiating a communication with another user, or with a group of users. The user's choice of communications medium can correspond to the preferences of other users or the capabilities of their respective devices. In at least one embodiment, a user can choose a combination of communications media when initiating a communication. For example, a user can choose video as the primary medium and text as a secondary medium.

In at least one embodiment, a system can maintain different user devices in different communications modes. A system can maintain the devices, of users that are actively communicating together, in an active communication mode that allows the devices to send and receive robust communications. For example, devices in the active communication mode can send and receive live video communications. In at least one embodiment, devices in the active communication mode can send and receive high-resolution, color videos. For users that are in the same group but not actively communicating together, a system can maintain the users' devices in an intermediate communication mode. In the intermediate communication mode, the devices can send and receive contextual communications. For example, the devices can send and receive intermittent video communications or periodically updated images. Such contextual communications may be suitable for devices in an intermediate mode of communication because the corresponding users are not actively communicating with each other. For devices that are not involved in active communications or are not members of the same group, the system can maintain an instant ready-on mode of communication. The instant ready-on mode of communication can establish a communication link between each device so that, if the devices later communicate in a more active manner, the devices do not have to establish a new communication link. The instant ready-on mode can be advantageous because it can minimize connection delays when entering groups and/or establishing active communications. Moreover, the instant ready-on mode of communication enables users to fluidly join and leave groups and subgroups without creating or destroying connections. For example, if a user enters a group with thirty other users, the instant ready-on mode of communication between the user's device and the devices of the thirty other users can be converted to an intermediate mode of communication. In at least one embodiment, the instant ready-on mode of communication can be facilitated by a server via throttling of communications between the users. For example, a video communications stream between users in the instant ready-on mode can be compressed, sampled, or otherwise manipulated prior to transmission therebetween. Once an intermediate mode of communication is established, the user's device can send and receive contextual communications (e.g., periodically updated images) to and from the thirty other users. Continuing the example, if the user then enters into a subgroup with two of the thirty other users, the intermediate mode of communication between the user's device and the devices of these two users can be converted (e.g., transformed or enhanced) to an active mode of communication. For example, if the previous communications through the intermediate mode only included an audio signal and a still image from each of the two other users, the still image of each user can fade into a live video of the user so that robust video communications can occur. As another example, if the previous communications through the intermediate mode only included an audio signal and a video with a low refresh rate (e.g., an intermittent video or a periodically updated image) from each of the two other users, the refresh rate of the video can be increased so that robust video communications can occur. Once a lesser mode of communication (e.g., an instant ready-on mode or an intermediate mode) has been upgraded to an active mode of communication, the user can send and receive robust video communications to and from the corresponding users. In this manner, a user's device can concurrently maintain multiple modes of communication with various other devices based on the user's communication activities. Continuing the example yet further, if the user leaves the subgroup and group, the user's device can convert to an instant ready-on mode of communication with the devices of all thirty other users.

As described above, a user can communicate with one or more subgroups of users. For example, if a user wants to communicate with certain members of a large group of users, the user can select those members and initiate a subgroup communication. Frequently used group rosters can be stored so that a user does not have to select the appropriate users every time the group is created. After a subgroup has been created, each member of the subgroup may be able to view the indicators (e.g., representations) of the other users of the subgroup on the display of his device. For example, each member of the subgroup may be able to see who is in the subgroup and who is currently transmitting communications to the subgroup. A user can also specify if he wants to communicate with the whole group or a subset of the group (e.g., a subgroup). For example, a user can specify that he wants to communicate with various users in the group or even just a single other user in the group. As described above, when a user is actively communicating with one or more other users, the user's device and the device(s) of the one or more other users can enter an active mode of communication. Because the instant ready-on mode of communication remains intact for the other devices, the user can initiate communications with multiple groups or subgroups and then quickly switch from any one group or subgroup. For example, a user can specify if a communication is to be transmitted to different groups or different individuals within a single group.

Recipients of a communication can respond to the communication. In at least one embodiment, recipients can respond, by default, to the entire group that received the original communication. In at least another embodiment, if a recipient chooses to do so, the recipient can specify that his response is sent to only the user sending the initial communication, some other user, or some other subgroup or group of users. However, it is to be understood that a user may be a member of a subgroup until he decides to withdraw from that subgroup and, that during the time that he is a member of that subgroup, all of his communications may be provided to the other members of the subgroup. For example, a video stream can be maintained between the user and each other user that is a member of the subgroup, until the user withdraws from that subgroup.

In at least one embodiment, the system can monitor and store all ongoing communications. For example, the system can store recorded video of video communications, recorded audio of audio-only communications, and recorded transcripts of text communications. In another example, a system can transcribe all communications to text, and can store transcripts of the communications. Any stored communications can be accessible to any user associated with those communications.

In at least one embodiment, a system can provide indicators about communications. For example, a system can provide indicators that convey who sent a particular communication, which users a particular communication was directed to, which users are in a subgroup, or any other suitable feature of communications. In at least one embodiment, a user device can include an output interface (e.g., output interface 108) that can separately provide communications and indicators about the communications. For example, a device can include an audio headset capable of providing communications, and a display screen capable of presenting indicators about the communications. In at least one embodiment, a user device can include an output interface (output interface 108) that can provide communications and indicators about the communications through the same media. For example, a device can include a display screen capable of providing video communications and indicators about the communications.

As described above, when a user selects one or more users of a large group of users to actively communicate with, the communication mode between the user's device and the devices of the selected users can be upgraded to an active mode of communication so that the users in the newly formed subgroup can send and receive robust communications. In at least one embodiment, the representations of the users can be rearranged so that the selected users are evident. For example, the sequence of the graphical representations corresponding to the users in the subgroup can be adjusted, or the graphical representations corresponding to the users in the subgroup can be highlighted, enlarged, colored, made easily distinguishable in any suitable manner, or any combination thereof. The display on each participating user's device can change in this manner with each communication in this manner. Accordingly, the user can distinguish subgroup that he's communicating with.

In at least one embodiment, a user can have the option of downgrading pre-existing communications and initiating a new communication by providing a user input (e.g., sending a new voice communication). In at least one embodiment, a user can downgrade a pre-existing communication by placing the pre-existing communication on mute so that any new activity related to the pre-existing communication can be placed in a cue to receive at a later time. In at least one embodiment, a user can downgrade a pre-existing communication by moving the pre-existing communication into the background (e.g., reducing audio volume and/or reducing size of video communications), while simultaneously participating in the new communication. In at least one embodiment, when a user downgrades a pre-existing communication, the user's status can be conveyed to all other users participating in the pre-existing communication. For example, the user's indicator can change to reflect that the user has stopped monitoring the pre-existing communication.

In at least one embodiment, indicators representing communications can be automatically saved along with records of the communications. Suitable indicators can include identifiers of each transmitting user and the date and time of that communication. For example, a conversation that includes group audio communications can be converted to text communications that include indicators representing each communication's transmitter (e.g., the speaker) and the date and time of that communication. Active transcription of the communications can be provided in real time, and can be displayed to each participating user. For example, subtitles can be generated and provided to users participating in video communications.

In at least one embodiment, a system can have the effect of putting all communications by a specific selected group of users in one place. Therefore, the system can group communications according to participants rather than generalized communications that are typically grouped by medium (e.g., traditional email, IM's, or phone calls that are unfiltered). The system can provide each user with a single interface to manage the communications between a select group of users, and the variety of communications amongst such a group. The user can modify a group by adding users to an existing group, or by creating a new group. In at least one embodiment, adding a user to an existing group may not necessarily incorporate that user into the group because each group may be defined by the last addressed communication. For example, in at least one embodiment, a new user may not actually be incorporated into a group until another user initiates a communication to the group that includes the new user's address.

In at least one embodiment, groups for which no communications have been sent for a predetermined period of time can be deactivated for efficiency purposes. For example, the deactivated groups can be purged or stored for later access. By decreasing the number of active groups, the system can avoid overloading its capacity.

In at least one embodiment, subgroups can be merged to form a single subgroup or group. For example, two subgroups can be merged to form one large subgroup that is still distinct from and contained within the broader group. As another example, two subgroups can be merged to form a new group that is totally separate from the original group. In at least one embodiment, groups be merged together to form a new group. For example, two groups can be merged together to form a new, larger group that includes all of the subgroups of the original group.

In at least one embodiment, a user can specify an option that allows other users to view his communications. For example, a user can enable other users in a particular group to view his video, audio, or text communications.

In at least one embodiment, users not included in a particular group or subgroup may be able to select and request access to that group or subgroup (e.g., by "knocking"). After a user requests access, the users participating in that group or subgroup may be able to decide whether to grant access to the requesting user. For example, the organizer or administrator of the group or subgroup may decide whether or not to grant access. As another example, all users participating in the group or subgroup may vote to determine whether or not to grant access. If access is granted, the new user may be able to participate in communications amongst the previous users. For example, the new user may be able to initiate public broadcasts or private communications amongst a subset of the users in that group or subgroup. Alternatively, if that group or subgroup had not been designated as private, visitors can enter without requesting to do so.

In at least one embodiment, it may be advantageous to allow each user to operate as an independent actor that is free to join or form groups and subgroups. For example, a user may join an existing subgroup without requiring approval from the users currently in the subgroup. As another example, a user can form a new subgroup without requiring confirmation from the other users in the new subgroup. In such a manner, the system can provide fluid and dynamic communications amongst the users. In at least one embodiment, it may be advantageous to allow each user to operate as an independent actor that is free to leave groups and subgroups.

In at least one embodiment, a server may only push certain components of a multi-user communication or event to the user depending on the capabilities of the user's device or the bandwidth of the user's network connection. For example, the server may only push audio from a multi-user event to a user with a less capable device or a low bandwidth connection, but may push both video and audio content from the event to a user with a more capable device or a higher bandwidth connection. As another example, the server may only push text, still images, or graphics from the event to the user with the less capable device or the lower bandwidth connection. In other words, it is possible for those participating in a group, a subgroup, or other multi-user event to use devices having different capabilities (e.g., a personal computer vs. a mobile phone), over communication channels having different bandwidths (e.g., a cellular network vs. a WAN). Because of these differences, some users may not be able to enjoy or experience all aspects of a communication event. For example, a mobile phone communicating over a cellular network may not have the processing power or bandwidth to handle large amounts of video communication data transmitted amongst multiple users. Thus, to allow all users in an event to experience at least some aspects of the communications, it can be advantageous for a system (e.g., system 250) to facilitate differing levels of communication data in parallel, depending on device capabilities, available bandwidth, and the like. For example, the system can be configured to allow a device having suitable capabilities to enter into the broadcast mode to broadcast to a group of users, while preventing a less capable device from doing so. As another example, the system can be configured to allow a device having suitable capabilities to engage in live video chats with other capable devices, while preventing less capable devices from doing so. Continuing the example, the system may only allow the less capable devices to communicate text or simple graphics, or audio chat with the other users. Continuing the example further, in order to provide other users with some way of identifying the users of the less capable devices, the system may authenticate the less capable devices (e.g., by logging onto a social network such as Facebook™) to retrieve and display a photograph or other identifier for the users of the less capable devices. The system can provide these photographs or identifiers to the more capable devices for view by the other users. As yet another example, more capable devices may be able to receive full access to presentation content (e.g., that may be presented from one of the users of the group to all the other users in the group), whereas less capable devices may only passively or periodically receive the content.

Figure 3:
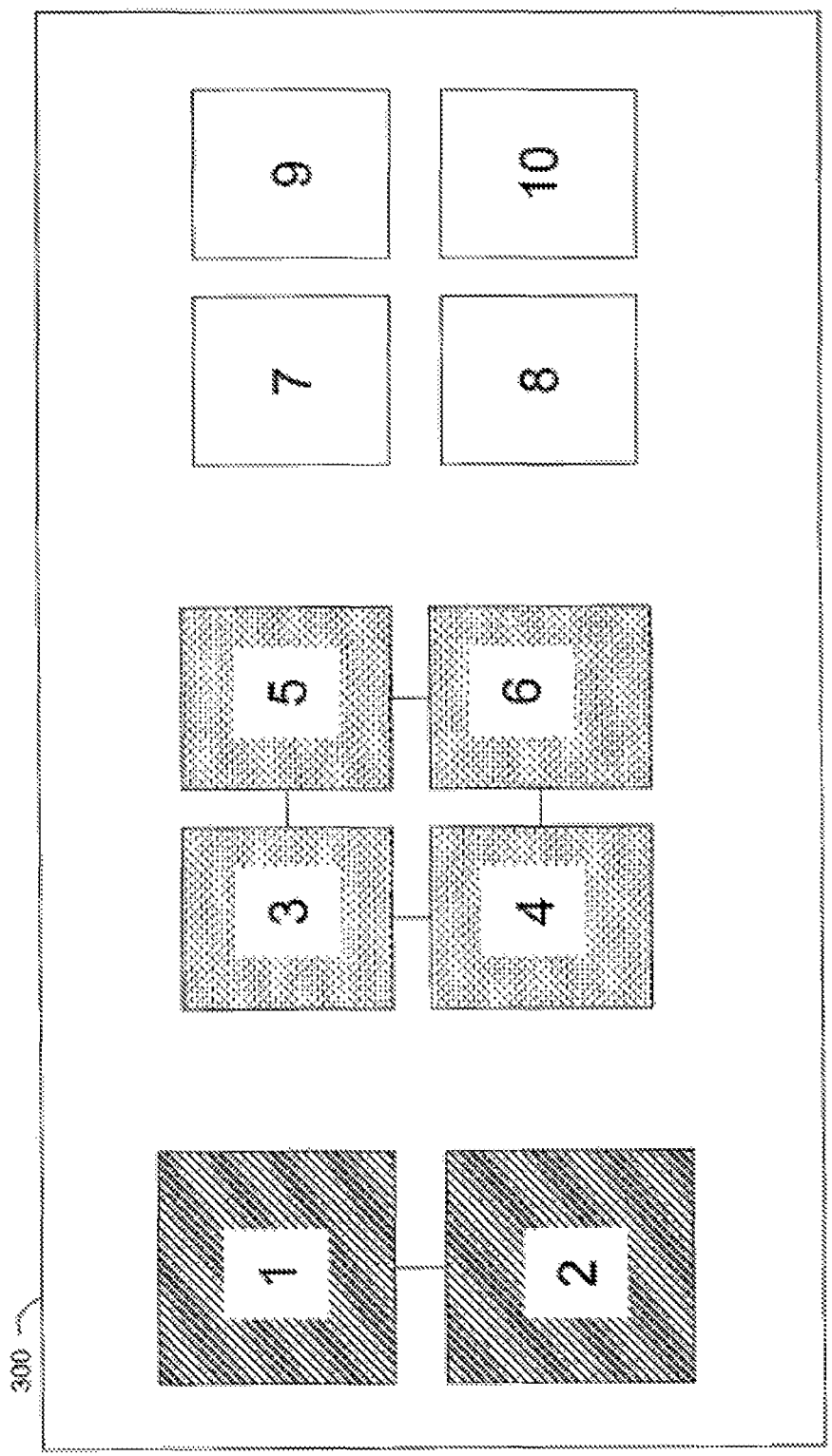
FIG. 3 is a schematic view of an illustrative display screen, in accordance with at least one embodiment.

FIG. 3 is a schematic view of an illustrative display screen. Screen 300 can be provided by a user device (e.g., device 100 or any one of devices 255-258). Screen 300 can include various indicators each representing a respective user on a communications network. In at least one embodiment, all users on a particular communications network can be represented on a display screen. For example, a communications network can include 10 users, and screen 300 can include at least one indicator per user. As another example, a group of users within a communications network can include 10 users, and screen 300 can include at least one indicator per user in that group. That is, screen 300 may only display users in a particular group rather than all users on a communications network. In at least one embodiment, each indicator can include communications from the corresponding user. For example, each indicator can include video communications from the corresponding user. In at least one embodiment, an indicator can include video communications at the center of the indicator with a border around the video communications (e.g., a shaded border around each indicator, as shown in FIG. 3). In at least one embodiment, each indicator can include contextual communications from the corresponding user. For example, an indicator can include robust video communications if the corresponding user is actively communicating. Continuing the example, if the corresponding user is not actively communicating, the indicator may only be a still or periodically updated image of the user. In at least one embodiment, at least a portion of each indicator can be altered to represent the corresponding user's current status, including their communications with other users.

Screen 300 can be provided on a device belonging to user 1, and the representations of other users can be based on this vantage point. In at least one embodiment, users 1-10 may all be members in the same group. In at least another embodiment, users 1-10 may be the only users on a particular communications network. As described above, each of users 1-10 can be maintained in at least an instant ready-on mode of communication with each other. As shown in screen 300, user 1 and user 2 can be communicating as a subgroup that includes only the two users. As described above, these two users can be maintained in an active mode of communication. That subgroup can be represented by a line joining the corresponding indicators. As also shown in screen 300, users 3-6 can be communicating as a subgroup. This subgroup can be represented by lines joining the indicators representing these four users. In at least one embodiment, subgroups can be represented by modifying the corresponding indicators to be similar. While the example shown in FIG. 3 uses different shading to denote the visible subgroups, it is to be understood that colors can also be used to make the corresponding indicators appear similar. It is also to be understood that a video feed can be provided in each indicator, and that only the border of the indicator may change. In at least one embodiment, the appearance of the indicator itself may not change at all based on subgroups, but the position of the indicator can vary. For example, the indicators corresponding to user 1 and user 2 can be close together to represent their subgroup, while the indicators corresponding to users 3-6 can be clustered together to represent their subgroup. As shown in screen 300, the indicators representing users 7-10 can appear blank. The indicators can appear blank because those users are inactive (e.g., not actively communicating in a pair or subgroup), or because those users have chosen not to publish their communications activities.

Figure 4:
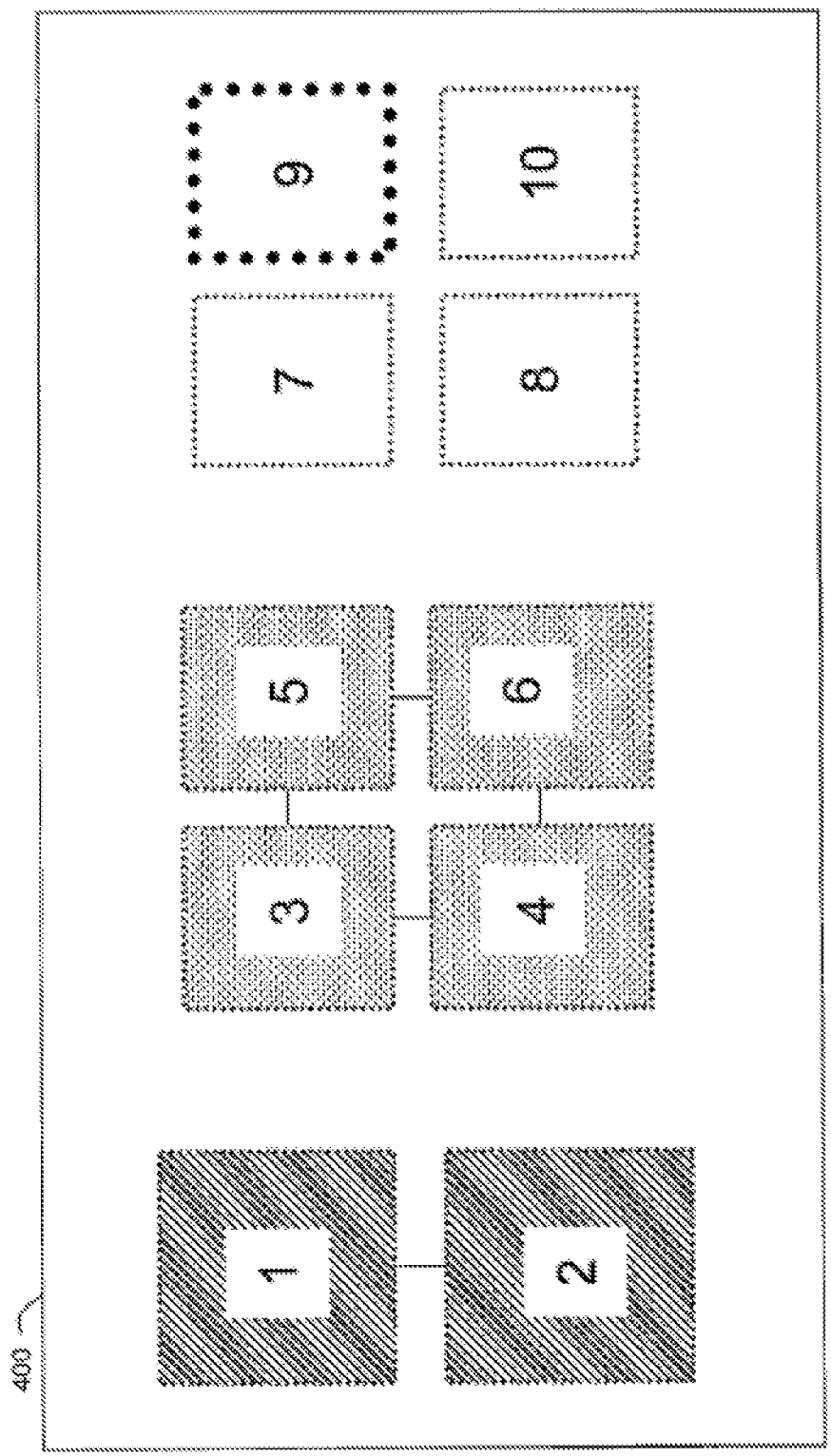
FIG. 4 is a schematic view of an illustrative display screen, in accordance with at least one embodiment.

FIG. 4 is a schematic view of another illustrative display screen. Screen 400 can also be provided by a user device (e.g., device 100 or any one of devices 255-258). Screen 400 can be substantially similar to screen 300, and can include indicators representing users 1-10. Like screen 300, screen 400 can represent subgroups (e.g., users 1 and 2, and users 3-6). Moreover, screen 400 can represent when a user is broadcasting to the entire group. For example, the indicator corresponding to user 9 can be modified to have a bold dotted border around the edge of the indicator to represent that user 9 is broadcasting to the group. In this example, the mode of communication between user 9 and each other user shown on screen 400 can be upgraded to an active mode so that users 1-8 and user 10 can receive the full broadcast. The indicator corresponding to each user in the group receiving the broadcast communication can also be modified to represent that user's status. For example, the indicators representing users 1-8 and 10 can be modified to have a thin dotted border around the edge of the indicators to represent that they are receiving a group communication from user 9. Although FIG. 4 shows indicator borders having specific appearances, it is to be understood that the appearance of each indicator can be modified in any suitable manner to convey that a user is broadcasting to the whole group. For example, the location of the indicators can be rearranged so that the indicator corresponding to user 9 is in a more prominent location. As another example, the size of the indicators can be changed so that the indicator corresponding to user 9 is larger than the other indicators.

Figure 5:
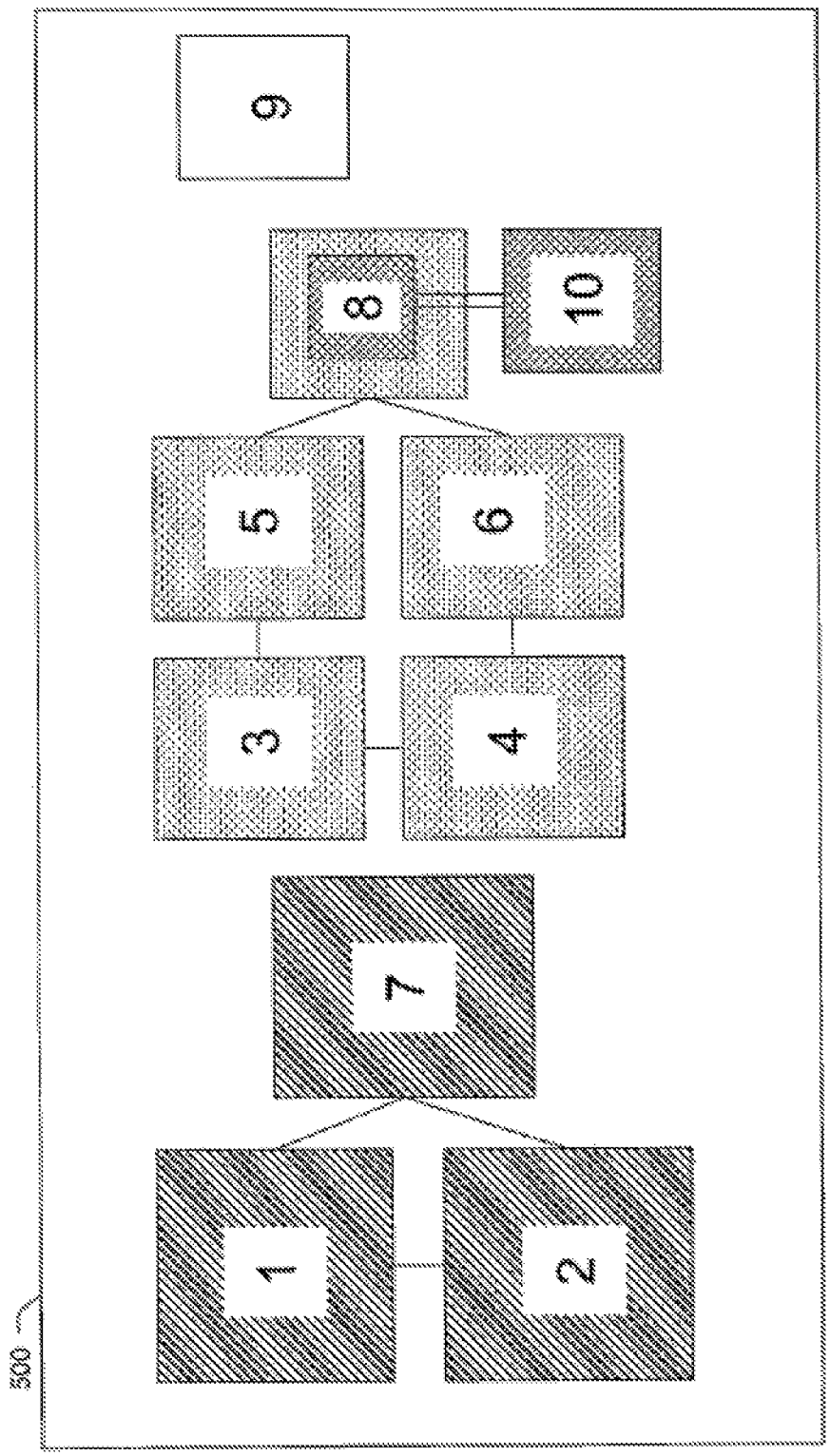
FIG. 5 is a schematic view of an illustrative display screen, in accordance with at least one embodiment.

FIG. 5 is a schematic view of yet another illustrative display screen. Screen 500 can also be provided by a user device (e.g., device 100 or any one of devices 255-258). Screen 500 can be substantially similar to screen 300, and can include indicators representing users 1-10. As shown in screen 500, user 7 can be part of the subgroup of users 1 and 2. Accordingly, the indicator representing user 7 can have a different appearance, can be adjacent to the indicators representing users 1 and 2, and all three indicators can be connected via lines. Additionally, user 8 can be part of the subgroup of users 3-6, and can be represented by the addition of a line connecting the indicator representing user 8 with the indicators representing users 5 and 6. User 8 and user 10 can form a pair, and can be communicating with each other. This pair can be represented by a line connecting user 8 and 10, as well as a change in the appearance of the indicator representing user 10 and at least a portion of the indicator representing user 8. Moreover, the type of communications occurring between user 8 and user 10 can be conveyed by the type of line coupling them. For example, a double line is shown in screen 500, which can represent a private conversation (e.g., user 1 cannot join the communication). While FIG. 5 shows a private conversation between user 8 and user 10, it is to be understood that, in at least one embodiment, the existence of private conversations may not be visible to users outside the private conversation.

Figure 6:
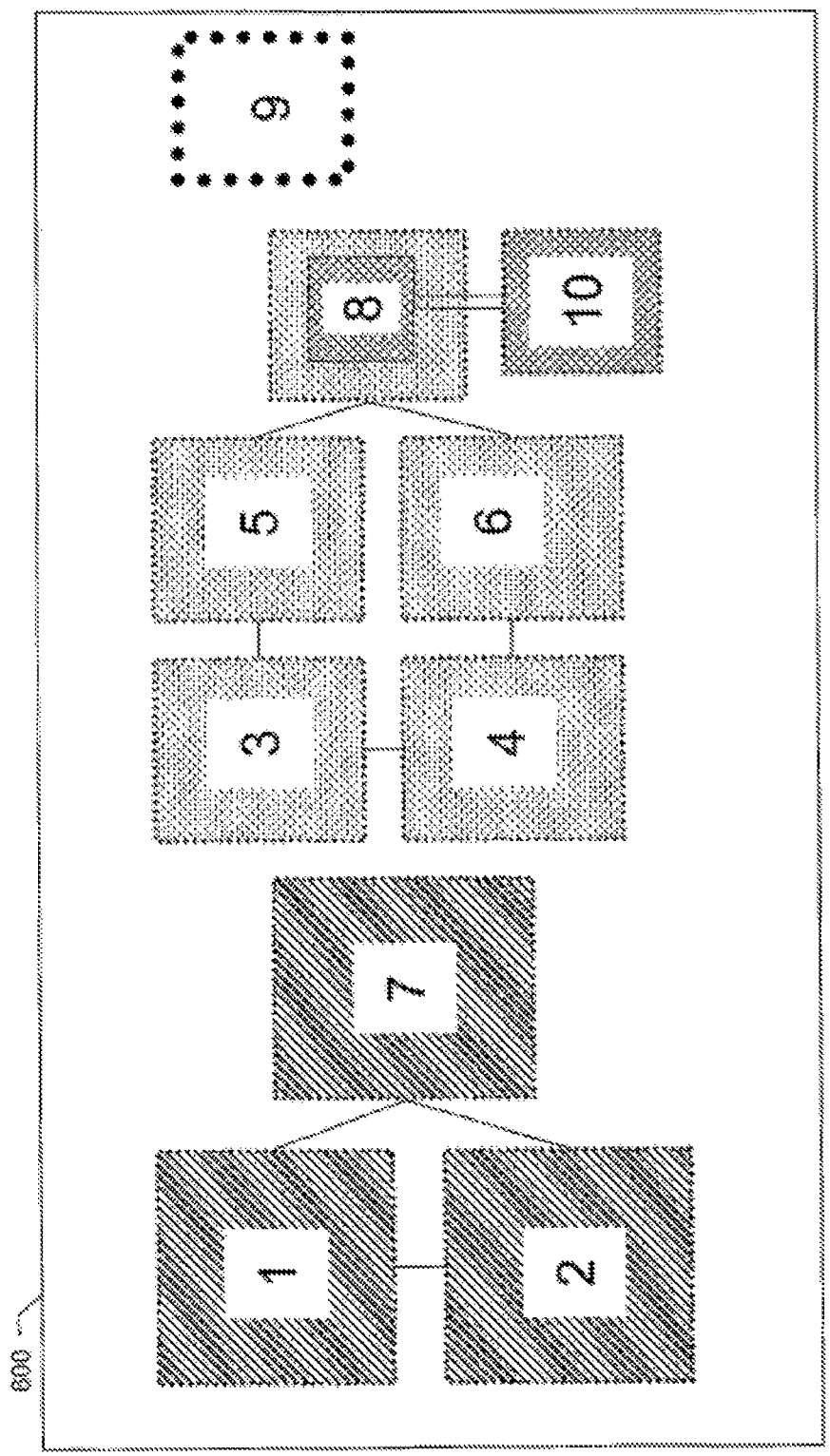
FIG. 6 is a schematic view of an illustrative display screen, in accordance with at least one embodiment.

FIG. 6 is a schematic view of yet still another illustrative display screen. Screen 600 can also be provided by a user device (e.g., device 100 or any one of devices 255-258). Screen 600 can be substantially similar to screen 300, and can include indicators representing users 1-10. Moreover, screen 600 can be similar to the status of each user shown in screen 500. For example, screen 600 can represent subgroups (e.g., users 8 and 10; users 1, 2 and 7; and users 3-6 and 8). Moreover, screen 600 can represent when a user is broadcasting to the entire group of interconnected users. In such a situation, regardless of each user's mode of communication with other users, each user can be in an active mode of communication with the broadcasting user so that each user can receive the broadcast. In at least one embodiment, the user indicators can be adjusted to represent group-wide broadcasts. For example, the indicator corresponding to user 9 can be modified to have a bold dotted border around the edge of the indicator, which represents that user 9 is broadcasting to the group. The indicator corresponding to each user in the group receiving the broadcast communication can also be modified to represent that user's status. For example, the indicators representing users 1-8 and 10 can be modified to have a thin dotted border around the edge of the indicator to represent that they are receiving a group communication from user 9. Although FIG. 6 shows indicator borders having specific appearances, it is to be understood that the appearance of each indicator can be modified in any suitable manner to convey that a user is broadcasting to the whole group, it is to be understood that the appearance of indicators can be modified in any suitable manner to convey that a user is broadcasting to the whole group. For example, the location of the indicators can be rearranged so that the indicator corresponding to user 9 is in a more prominent location. As another example, the size of the indicators can be changed so that the indicator corresponding to user 9 is larger than the other indicators.

While the embodiments shown in FIGS. 3-6 show exemplary methods for conveying the communication interactions between users, it is to be understood that any suitable technique can be used to convey the communication interactions between users. For example, the communication interactions between users can be conveyed by changing the size of each user's indicator, the relative location of each user's indicator, any other suitable technique or any combination thereof (described in more detail below).

In at least one embodiment, a user can scroll or pan his device display to move video or chat bubbles of other users around. Depending on whether a particular chat bubble is moved in or out of the viewable area of the display, the communication mode between the user himself and the user represented by the chat bubble can be upgraded or downgraded. That is, because a user can be connected with many other users in a communication network, a display of that user's device may not be able to simultaneously display all of the indicators corresponding to the other users. Rather, at any given time, the display may only display some of those indicators. Thus, in at least one embodiment, a system can be provided to allow a user to control (e.g., by scrolling, panning, etc.) the display to present any indicators not currently being displayed. Additionally, the communication modes between the user and the other users (or more particularly, the user's device and the devices of the other users) on the network can also be modified depending on whether the corresponding indicators are currently being displayed.

FIG. 7A shows an illustrative display screen 700 that can be provided on a user device (e.g., user device 100 or any of user devices 255-258). Screen 700 can be similar to any one of screens 300-600. Indicator 1 can correspond to a user 1 of the user device, and indicators 2-9 can represent other users 2-9 and their corresponding user devices, respectively.

To prevent overloading of the system resources of the user device, the user device may not be maintained in an active communication mode with each of the user devices of users 2-9, but may rather maintain a different communication mode with these devices, depending on whether the corresponding indicators are displayed. As shown in FIG. 7A, for example, indicators 2-4 corresponding to users 2-4 can be displayed in the display area of screen 700, and indicators 5-9 corresponding to users 5-9 may not be displayed within the display area. Similar to FIGS. 3-6, for example, users that are paired can be in an active mode of communication with one another. For example, as shown in FIG. 7A, users 1 and 2 can be in an active mode of communication with one another. Moreover, the user can also be in an intermediate mode of communication with any other users whose indicators are displayed in screen 700. For example, user 1 can be in an intermediate mode of communication with each of users 3 and 4. This can allow user 1 to receive updates (e.g., periodic image updates or low-resolution video from each of the displayed users). For any users whose indicators are not displayed, the user can be in an instant ready-on mode of communication with those users. For example, user 1 can be in an instant ready-on mode of the communication with each of users 5-9. In this manner, bandwidth can be reserved for communications between the user and other users whose indicators the user can actually view on the screen. In at least one embodiment, the reservation or bandwidth or optimization of a communication experience can be facilitated by an intermediating server (e.g., server 251) that implements a selective reduction of frame rate. For example, the server can facilitate the intermediate mode of communication based on available bandwidth. In at least another embodiment, the intermediate mode can be facilitated by the client or user device itself.

To display indicators not currently being displayed in screen 700, user 1 can, for example, control the user device to scroll or pan the display. For example, user 1 can control the user device by pressing a key, swiping a touch screen of the user device, gesturing to a motion sensor or camera of the user device, or the like. FIG. 7B shows screen 700 after the display has been controlled by the user to view other indicators. As shown in FIG. 7B, the position of indicator 7 (which was not previously displayed in screen 700 of FIG. 7A) is now within the display area. Because the user can now view indicator 7 on screen 700, the system can upgrade the communication mode between the user device of user 1 and the user device of user 7 from the instant ready-on mode to the intermediate mode. Additionally, indicator 3 (which was previously displayed in the display area of screen 700 of FIG. 7A) is now outside of the display area. Because the user can no longer view indicator 3, the system can downgrade the communication mode between users 1 and 3 from the intermediate mode to the instant ready-on mode. In at least one embodiment, the position of indicator 1 can be fixed (e.g., near the bottom right portion of screen 700) such that user 1 can easily identify and locate his own indicator on screen 700. In these embodiments, because user 1 may still be interacting with user 2 during and after the scrolling or panning of screen 700, indicators 1 and 2 can remain in their previous respective positions as shown in FIG. 7B. In at least another embodiment, the position of each of indicators 1-9 can be modified (e.g., by user 1) as desired. In these embodiments, indicators 1 and 2 can move about within the display area according to the scrolling or panning of the display, but may be restricted to remain with the display area (e.g., even if the amount of scrolling or panning is sufficient to move those indicators outside of the display area).

Although FIGS. 7A and 7B show indicators 2-9 being positioned and movable according to a virtual coordinate system, it should be appreciated that the positions of indicators 2-9 may be arbitrarily positioned. That is, in at least one embodiment, scrolling or panning of screen 700 by a particular amount may not result in equal amounts of movement of each of indicators 2-9 with respect to screen 700. For example, when user 1 pans the display to transition from screen 700 in FIG. 7A to screen 700 in FIG. 7B, indicator 7 can be moved within the display area of screen 700, and indicator 3 may not be moved outside of the display area.

In at least one embodiment, the system can additionally, or alternatively, allow a user to control the display of indicators and the modification of the communication modes in other manners. For example, a device display can display different video or chat bubbles on different virtual planes (e.g., background, foreground, etc.). Each plane can be associated with a different communication mode (e.g., instant ready-on, intermediate, active, etc.) between the device itself and user devices represented by the chat bubbles. For example, in addition to, or as an alternative to providing a scroll or pan functionality (e.g., as described above with respect to FIGS. 7A and 7B), a system can present the various indicators on different virtual planes of the screen. The user device can be in one communication mode with user devices corresponding to indicators belonging to one plane of the display, and can be in a different communication mode with user devices corresponding to indicators belonging to a different plane of the display. FIG. 7C shows an illustrative screen 750 including different virtual display planes. The actual planes themselves may or may not be apparent to a user. However, the indicators belonging to or positioned on one plane may be visually distinguishable from indicators of another plane. That is, indicators 2-9 can be displayed differently from one another depending on which plane they belong to. For example, as shown in FIG. 7C, indicators 1 and 2 can each include a solid boundary, which can indicate that they are located on or belong to the same plane (e.g., a foreground plane). The user devices of users 1 and 2 can be interacting with one another as a pair or couple as shown, and thus, can be in an active communication mode with one another. Indicators 3 and 4 can belong to an intermediate plane that can be virtually behind each of the foreground plane and the intermediate plane, and that can have a lower prominence or priority than the foreground plane. To indicate to a user that indicators 3 and 4 belong to a different plane than indicator 2, indicators 3 and 4 can be displayed slightly differently. For example, as shown in FIG. 7C, indicators 3 and 4 can each include a different type of boundary. Moreover, because the user devices of users 1, 3, and 4 may not be actively interacting with one another, the user device of user 1 may be in an intermediate mode with the user devices of users 3 and 4. Indicators 5-9 can be located on or belong to a different plane (e.g., a background plane that can be virtually behind each of the foreground and intermediate planes, and that can have a lower prominence or priority than these planes). To indicate to a user that indicators 5-9 belong to a different plane than indicators 2-4, indicators 5-9 can also be displayed slightly differently. For example, as shown in FIG. 7C, indicators 5-9 can each include yet a different type of boundary. Moreover, because user devices 1 and 5-9 may not be actively interacting with one another, and because indicators 5-9 may be located on a less prominent or a lower priority background plane, the user device of user 1 can be in an instant ready-on mode with each of the user devices of users 5-9.

It should be appreciated that the indicators can be represented using different colors, different boundary styles, etc., as long as user 1 can easily distinguish user devices that are in one communication mode with his user device (e.g., and belonging to one plane of the display) from other user devices that are in a different communication mode with his user device (e.g., and belonging to another plane of the display). For example, those indicators on a background plane of the display can be sub-optimally viewable, whereas, those indicators on the foreground plane of the display can be optimally viewable.

To allow user 1 to change communication modes with users displayed in screen 750, user 1 can select (e.g., by clicking using a mouse, tapping via a touch screen, or the like) a corresponding indicator. In at least one embodiment, when a user selects an indicator corresponding to a user device that is currently in an instant ready-on mode with that user's device, their communication mode can be upgraded (e.g., to either the intermediate mode or the active mode). For example, when user 1 selects indicator 9, the communication mode between the user devices of users 1 and 9 can be upgraded from an instant ready-on mode to either an intermediate mode or an active mode. As another example, when user 1 selects indicator 4, the communication mode between the user devices of users 1 and 4 can be upgraded from an intermediate mode to an active mode.

In at least one embodiment, when an indicator is selected by a user, any change in communication mode between that user's device and the selected user device can be applied to other devices whose indicators belong to the same plane. For example, when user 1 selects indicator 5, not only can the user device of user 5 be upgraded to the intermediate or active mode with the user device of user 1, and not only can the boundary of indicator 5 be changed from a dotted to a solid style, but the communication mode between the user device of user 1 and one or more of the user devices of users 6-9 can also be similarly upgraded, and the display style of corresponding indicators 6-9 can be similarly modified. It should be appreciated that, although FIG. 7C has been described above as showing indicators of user devices in any of an instant ready-on mode, an intermediate mode, and an active mode with the user device of user 1, the system can employ more or fewer applicable communication modes (and thus, more or fewer virtual display planes).

In at least one embodiment, the system can provide a user with the ability to manipulate indicators and communication modes by scrolling or panning the display (e.g., as described above with respect to FIGS. 7A and 7B), in conjunction with selecting indicators belonging to different planes (e.g., as described above with respect to FIG. 7C). For example, when a user selects an indicator that is displayed within a display area of a screen, and that happens to be on the background plane with a group of other indicators, the selected indicator, as well as one or more of the group of indicators, can be upgraded in communication mode. Moreover, any indicators from that group of indicators that may not have previously been displayed in the display area, can be also be "brought" into the display area.

In at least one embodiment, the system can also provide a user device with the ability to store information about currently displayed indicators. More particularly, indicators that are currently displayed (e.g., on screen 700) can represent a virtual room within which the user is located. The system can store information pertaining to this virtual room and all users therein. This can allow a user to jump or transition from one virtual room to another, simply by accessing stored room information. For example, the system can store identification information for the user devices corresponding to currently displayed indicators (e.g., user device addresses), and can correlate that identification information with the current display positions of those indicators. In this manner, the user can later pull up or access a previously displayed room or group of indicators, and can view those indicators in their previous display positions.

As another example, the system can store current communication modes established between the user device and other user devices. More particularly, the user may have previously established an active communication mode with some displayed users, and an intermediate communication mode with other displayed users. These established modes can also be stored and correlated with the aforementioned identification information and display positions. In this manner, the user can later re-establish previously set communication modes with the room of users (e.g., provided that those user devices are still connected to the network). In any instance where a particular user device is no longer connected to the network, a blank indicator or an indicator with a predefined message (e.g., alerting that the user device is offline) can be shown in its place.

The system can store the identification information, the display positions, and the communication modes in any suitable manner. For example, the system can store this information in a database (e.g., in memory 103). Moreover, the system can provide a link to access stored information for each virtual room in any suitable manner. For example, the system can provide this access using any reference pointer, such as a uniform resource locator ("URL"), a bookmark, and the like. When a user wishes to later enter or join a previously stored virtual room, the user can provide or select the corresponding link or reference pointer to instruct the system to access the stored room information. For example, the system can identify the user devices in the virtual room, the corresponding indicator display positions, and the applicable communication modes, and can re-establish the virtual room for the user. That is, the indicators can be re-displayed in their previous display positions, and the previous communication modes between the user device and the user devices in the room can be re-established.

The system can allow the user to store or save room information in any suitable manner. For example, the system can allow the user to save current room information via a user instruction or input. Additionally, or alternatively, the system can be configured to automatically store room information. For example, the system can be configured or set to periodically save room information. As another example, the system can be configured to store room information when certain predefined conditions (e.g., set by the user) are satisfied.

In at least one embodiment, video or chat bubbles can be overlaid on one another, and can be scaled or resized depending on how much the user is interacting with the users represented by these bubbles. This can provide the user with a simulated 3-D crowd experience, where bubbles of those that the user is actively communicating with can appear closer or larger than bubbles of other users. Thus, although FIGS. 7A-7C show the various indicators being positioned with no overlap and each having the same or similar size, it can be advantageous to display some of the indicators with at least partial overlap and in different sizes. This can provide a dynamic three-dimensional ("3D") feel for a user. For example, the system can display one or more indicators at least partially overlapping and/or masking other indicators, which can simulate an appearance of some users being in front of others. As another example, the system can display the various indicators in different sizes, which can simulate a level of proximity of other users to the user.

Figure 7D:
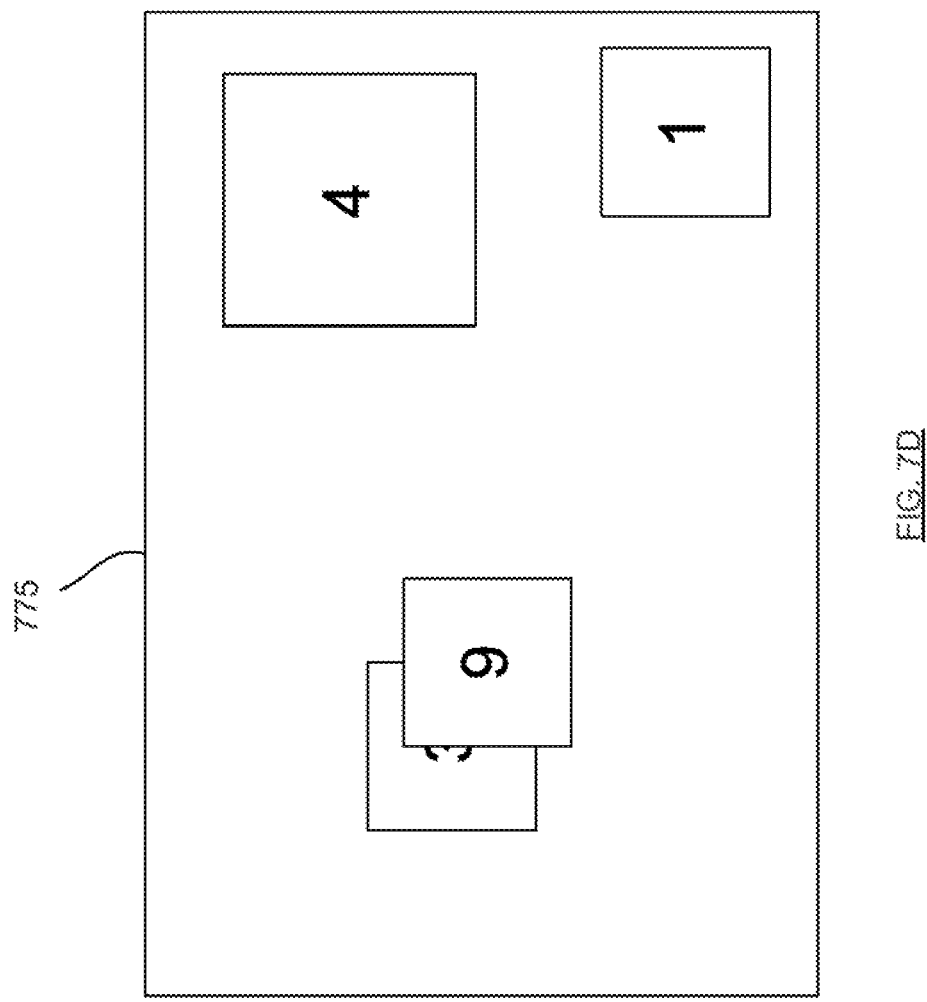
FIG. 7D is a schematic view of an illustrative display screen displaying indicators in overlap and in different sizes, in accordance with at least one embodiment.

FIG. 7D is an illustrative screen 775 displaying indicators 1, 3, 4, and 9. As shown in FIG. 7D, for example, the system can display indicators 3 and 9 such that indicator 9 at least partially overlaps and/or masks indicator 3. This can provide an appearance that indicator 9 is closer or in front of indicator 3. Moreover, the system can also display indicator 4 in a larger size than indicators 3 and 9. This can provide an appearance that indicator 4 is closer than either of indicators 3 and 9. The positions and sizes of these indicators can be modified in any suitable manner (e.g., via user selection of the indicators). When indicator 3 is selected, for example, the system can display indicator 3 over indicator 9 such that indicator 3 overlaps or masks indicator 9. Moreover, the size of indicator 3 relative to indicator 4 can also change when indicator 3 is selected.

In at least one embodiment, the system can determine the size at which to display the indicators based on a level of interaction between the user and the users corresponding to the indicators. For example, the indicators corresponding to the users that the user is currently, or has recently been, interacting with can be displayed in a larger size. This can allow the user to visually distinguish those indicators that may be more important or relevant.

In at least another embodiment, the system can randomly determine indicator overlap and size. For example, while all indicators may include video streams of a similar size or resolution, they can be randomly displayed on different devices (e.g., devices 255-258) in different sizes to provide a varying and dynamic arrangement of indicators that is different for each user device. Moreover, in at least one embodiment, the system can periodically modify indicator overlap, indicator size, and overall arrangement of the indicators on a particular user device. This can remind a user (e.g., who may not have engaged in communications for a predefined period of time) that he is indeed free to engage in conversation with other users.

In at least one embodiment, a user can view his or her own video or chat bubble in a centralized location on the display, where bubbles representing other users can be displayed around the user's own bubble. This can provide a self-centric feel for the user, as if the user is engaged in an actual environment of people around him or her. Thus, the system can arrange indicators on a screen with respect to the user's own indicator (e.g., indicator 1 in FIGS. 7A-7D), which can simulate a self-centric environment, where other users revolve around the user or "move" about on the screen depending on a position of the user's own indicator. For example, the user's own indicator can be fixed at a position on the screen (e.g., at the lower right corner, at the center of the screen, etc.). Continuing the example, if the user selects indicators to initiate communications with, the system can displace or "move" the selected indicators towards the user's own indicator to simulate movement of users represented by the selected indicators towards the user.

Figure 7E:
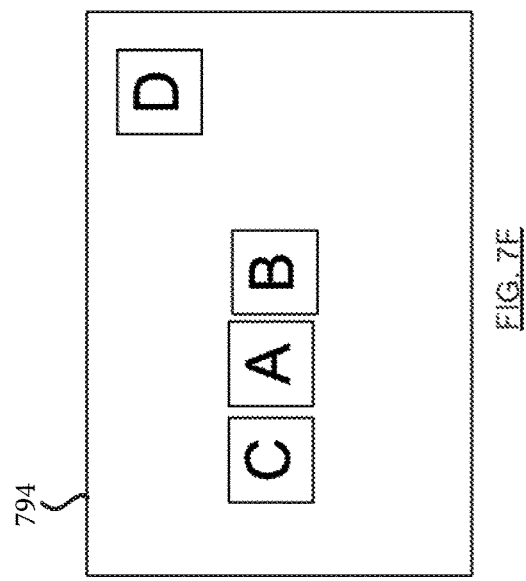
FIGS. 7E-7G are schematic views of illustrative display screens of different user devices, in accordance with at least one embodiment.
Figure 7F:
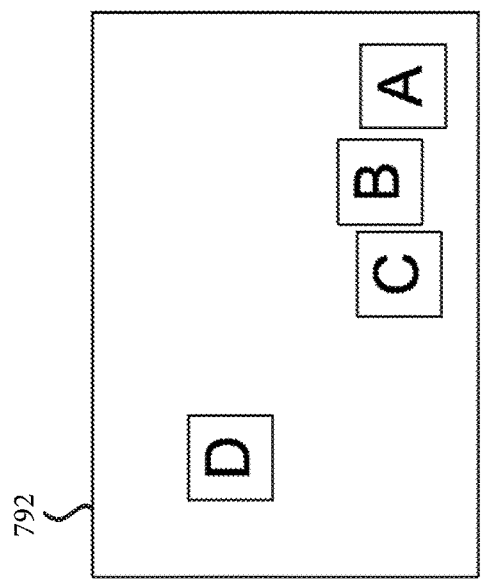
Figure 7G:
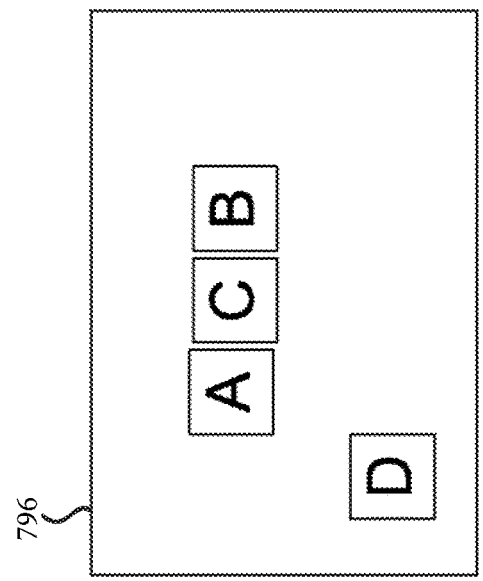

In at least one embodiment, the system can be independently resident or implemented on each user device, and can manage the self-centric environment independently from other user devices. FIGS. 7E-7G show illustrative screens 792, 794, and 796 that can be displayed on user devices of users A, B, and C, respectively, who may each be part of the same chat group or environment. As shown in FIG. 7E, screen 792 of user A's device can display user A's own indicator A at a particular position, indicators B and C (representing users B and C, respectively) in other positions relative to indicator A, and an indicator D (representing a user D) in yet another position. In contrast, as shown in FIG. 7F, screen 794 of user B's device can display user B's own indicator B at a different position, indicators A and C in positions relative to indicator B, and indicator D in yet another position. Moreover, as shown in FIG. 7G, screen 796 of user C's device can display user C's own indicator C at a different position, indicators A and B in other positions relative to indicator C, and indicator D in yet another position. In this way, there may be no need for a single system to create and manage a centralized or fixed mapping of indicator positions that each user device is constricted to display. Rather, an implementation of the system can be run on each user device to provide the self-centric environment for that user device, such that a view of user indicators on a screen of one user's device may not necessarily correspond to a view of those same indicators on a screen of another user's device.

In at least one embodiment, a user can view a mingle bar or buddy list of video or chat bubbles on the device display. The user can select one or more of these bubbles to engage in private chat with the corresponding users. This is advantageous because a multi-user communication environment can involve many users, which can be difficult for a particular user to identify and select other users to communicate with. Thus, in at least one embodiment, a system can provide an easily accessible list or an array of indicators from which a user can initiate communications. The system can determine which indicators to provide in the array in any suitable manner. For example, the system can include indicators that represent other users that the user is currently, or has previously communicated with. As another example, the system can include indicators that the user is not currently directly communicating with, but that may be in the same subgroup as the user (e.g., those in an intermediate mode of communication with the user). This can provide the user with instant access to other users, which can allow the user to easily communicate or mingle with one or more other users. In at least one embodiment, the list or array of indicators can correspond to other users that are currently engaged in an event, but may not be in the instant ready-on mode with the user.

Although not shown, the system can also include an invitation list or array of users that are associated with the user in one or more other networks (e.g., social networks). The system can be linked to these other networks via application program interfaces (APIs), and can allow a user to select one or more users to invite to engage in communications through the system. For example, the invitation list can so one or more friends or associates of the user in a social network. By clicking a user from this list, the system can transmit a request to the user through the API to initiate a communication (e.g., audio or video chat). If the selected user is also currently connected to the system network, the system can allow the user to communicate with the selected user in, for example, the active mode of communication.

FIG. 8 is an illustrative array 810 of indicators. As shown in FIG. 8, array 810 can include multiple indicators that each represents to a respective user. Each indicator can include one or more of a name, an image, a video, a combination thereof, or other information that identifies the respective user. Although FIG. 8 only shows array 810 including indicators 2-7, array 810 can include fewer or more indicators. For example, array 810 can include other indicators that can be viewed when a suitable user input is received. More particularly, array 810 can include more indicators to the left of indicator 2 that can be brought into view when a user scrolls or pans array 810.

Each of the indicators of array 810 can be selectable by a user to initiate communications (e.g., similar to how the indicators of screens 300-700 can be selectable). In at least one embodiment, the system can facilitate communication requests in response to a user selection of an indicator. For example, upon user selection of a particular indicator, the system can send a request (e.g., via a pop-up message) to the device represented by the selected indicator. The selected user can then either approve or reject the communication request. The system can facilitate or establish a communication between the user and the selected user in any suitable manner. For example, the system can join the user into any existing chatroom or subgroup that the selected user may currently be a part of. As another example, the system can pair up the two users in a private chat (e.g., similar to pairs 1 and 2 in FIGS. 7A and 7B). As yet another example, the system can join the selected user into any existing chatroom or subgroup that the user himself may currently be a part of. In any of the above examples, each of the two users can remain in any of their pre-existing subgroups or private chats, or can be removed from those subgroups or chats.

In at least one embodiment, the system can also utilize the list or array of indicators to determine random chats or subgroups for the user to join. For example, if the user appears to be disengaged from all communications for an extended period of time, the system can offer suggested users from array 810 that the user can initiate communications with. Additionally, or alternatively, the system can automatically select one or more users from array 810 to form subgroups or chats with the user.

Thus, it should be appreciated that the various embodiments of the systems described above with respect to FIGS. 7A-7G and 8 can provide a graphics display of an illusion of a continuous array of a large number of users or participants in a large scale communications network. Those skilled in the art will also appreciate that the system can be embodied as software, hardware, or any combination thereof. Moreover, those skilled in the art will appreciate that components of the systems can reside on one or more of the user device and a server (e.g., server 251) that facilitates communications between multiple user devices.

In at least one embodiment, the behavior, reaction, or status of users in an audience of a multi-user event can be analyzed and reported to a presenter of the event. For example, the webcam streams, or microphone captured audio of one or more members in the audience can be analyzed so as to categorize the audience into groups. The presenter can use this information to determine if the audience is not paying attention, and the like, and can engage in private chat with one or more members that have been categorized in these groups. In particular, a system can provide a user with the ability to host a multi-user event, such as a web-based massive open online course ("MOOC"). For example, the system can allow a host or presenter to conduct the event on a presenter device (e.g., user device 100 or any of devices 255-258) to an audience of users of other similar audience devices. In a real-life event, a presenter can typically readily assess the behavior or level of engagement of the audience. For example, a presenter can identify the raising of hands, any whispering or chatting amongst the audience, the overall level of interest of the audience (e.g., excitement, lack of excitement, and any other reactions or sentiments), changes in a rate of any thereof, and the like. Thus, to provide a presenter hosting a large scale online event with a similar ability, the system can include an audience evaluator that evaluates or assesses one or more of the behavior, status, reaction, and other characteristics of the audience, and that filters or categorizes the audience into organized groups based on the assessment. The system can additionally provide the results of the categorization to the presenter as dynamic feedback that the presenter would not normally otherwise receive during a MOOC, for example. This information can help the presenter easily manage a large array of audience users, as well as dynamically adjust or modify his presentation based on the reactions of the audience. The system can also store any information regarding the evaluation, such as the time any changes occurred (e.g., the time when a hand was raised, the time when a user became inattentive, etc.), and the like. Moreover, the system can provide the presenter with the ability to interact with one or more of the users in the categorized groups (e.g., by engaging in private communications with one or more of those users).

The audience evaluator can be implemented as software, and can include one or more algorithms suitable for evaluating, or otherwise analyzing the audience (e.g., known video analysis techniques, including facial and gesture recognition techniques). Because the audience devices can be configured to transmit video and audio data or streams (e.g., provided by respective webcams and microphones of those devices), the audience evaluator can utilize these streams to evaluate the audience. In at least one embodiment, a server (e.g., such as server 251) can facilitate the transfer of video and audio data or streams between user devices, as described above with respect to FIG. 2, and the audience evaluator can evaluate the audience by analyzing these streams.

The audience evaluator can be configured to determine any suitable information about the audience. For example, the audience evaluator can be configured to determine if one or more users are currently raising their hands, engaged in chats with one or more other users, looking away, being inattentive, typing or speaking specific words or phrases (e.g., if the users have not set their voice or text chats to be private), typing or speaking specific words or phrases repeatedly during a predefined period of time set by the presenter, typing specific text in a response window associated with a questionnaire or poll feature of the event, and the like. The audience evaluator can also classify or categorize the audience based on the analysis, and can provide this information to the presenter (e.g., to the presenter device).

In at least one embodiment, the audience evaluator is provided in a server (e.g., server 251 or any similar server). In these embodiments, the server can perform the analysis and categorization of the streams, and can provide the results of the categorization to the presenter device. In at least another embodiment, the audience evaluator can be provided in one or more of the presenter device and the audience devices. In yet at least another embodiment, some components of the audience evaluator is provided in one or more of the server, the presenter device, and the audience devices.

The system can dynamically provide the audience evaluation results to the presenter device, as the results change (e.g., as the behavior of the audience changes). The system can provide these results in any suitable manner. For example, the system can provide information that includes a total number of users in each category. Moreover, the system can also display and/or move indicators representing the categorized users. This can alert the presenter to the categorization, and can allow the presenter to select and interact with one or more of those users. FIG. 9A shows an illustrative screen 900 that includes one or more categorized groups of users in an audience. Server 900 can be provided on any presenter device. As shown in FIG. 9A, screen 900 can display content 901 (e.g., a slideshow, a video, or any other type of content that is currently being presented by the presenter device to one or more audience devices). Screen 900 can also include categories 910 and a number 920 of users belonging to each category. Screen 900 can also display one or more sample indicators 930 that each represents a user in the particular category. The audience evaluator can determine which indicators to display as sample indicators 930 in any suitable manner (e.g., arbitrarily or based on any predefined criteria). For example, each indicator 930 can correspond to the first user that the audience evaluator determines to belong to the corresponding category.

Categories 910, numbers 920, and indicators 930 can each be selectable by a presenter (e.g., by clicking, touching, etc.), and the system can facilitate changes in communications or communication modes amongst the participants based on any selection. For example, if the presenter selects an indicator 930 for the category of users whose hands are "raised," the user corresponding to the selected indicator 930 can be switched to a broadcasting mode (e.g., similar to that described above with respect to FIG. 4). The selected indicator can also be displayed in a larger area of screen 900 (e.g., in area 940) of the presenter device, as well as at similar positions on the displays of the other audience devices. As another example, if the presenter selects an indicator 930 for the category of users who are engaged in chats (e.g., private or not) with users in the audience or with other users, the presenter can form a subgroup with all of those users, and can upgrade a communication mode between the presenter device and the audience devices of those users. In this way, the presenter can communicate directly with one or more of those users (e.g., by sending and receiving video and audio communications), and can request that those users stop chatting. This subgroup of users can be displayed on the screen of the presenter device, similar to the screens shown in FIGS. 7A-7D, and can represent a virtual room of users that the presenter can interact with.

In at least one embodiment, the system can also categorize the audience based on background information on the users in the audience. For example, the system can be configured to only include users in the "hand raised" category, if they have raised their hands less than a predetermined number of times during the event (e.g., less than 3 times in the past hour). This can prevent one or two people in the audience from repeatedly raising their hands and drawing the attention of the presenter. As another example, the system can be configured to only include users in a particular category if they have attended or are currently attending a particular university (e.g., those who have attended Harvard between the years of 1995-2000). This can help the presenter identify any former classmates in the audience. Other background information can also be taken into account in the categorization, including, but not limited to users who have entered a response to a question (e.g., posed by the presenter) correctly or incorrectly, users who have test scores lower than a predefined score, and users who speak a particular language. It should be appreciated that the system can retrieve any of the background information via analysis of the communications streams from the users, any profile information previously provided by the users, and the like.

It should be appreciated that, although FIG. 9A only shows four categories of users, screen 900 can display more or fewer categories, depending on the preferences of the presenter. More particularly, the audience evaluator can also provide an administrative interface (not shown) that allows the presenter to set preferences on which categories are applicable and should be displayed.

In at least one embodiment, the administrative interface can provide an option to monitor any words or phrases (e.g., typed or spoken) that are being communicated amongst the audience more than a threshold number of times, and to flag or alert the presenter when this occurs. When this option is set and customized, the audience evaluator can monitor and evaluate or analyze data transmitted by the audience devices to detect any such words or phrase that are being repeatedly communicated.

Because the number of users in the audience can be large, it can be a drain on the resources of a server (e.g., that may be facilitating the event) or the presenter device to evaluate to analyze the streams from each of the audience devices. Thus, in at least one embodiment, the system can additionally, or alternatively, be provided in one or more of the audience devices. More particularly, each user device in the audience (e.g., that is attending an event) can include a similar audience evaluator for analyzing one or more streams captured by the user device itself. The results of the analysis can then be provided (e.g., as flags or other suitable type of data) to the server or to the presenter device for identification of the categories. In this way, the presenter device or server can be saved from having to evaluate or analyze all of the streams coming from the audience devices. The audience evaluator of each audience device can also provide information similar to that shown in FIG. 9A to a user of that device. This can allow the user to view content being presented by the presenter device, as well as categorization of other users in the audience. For example, the user can view those in the audience who have their hands raised, and can engage in communications with one or more of these users by clicking an indicator (e.g., similar to indicator 930). As another example, the user can identify those in the audience who have or is currently attending a particular school, and can socialize with those users. In at least one embodiment, each of the audience devices can also provide an administrative tool that is similar to the administrative tool of the presenter device described above. This can allow the corresponding users of the audience devices to also set preferences on which categories to filter and display.

It should be appreciated that screen 900 can also include indicators for all of the users in the audience. For example, screen 900 can be configured to show indicators similar to those shown in the screens of FIGS. 7A-7D, and can allow the presenter to scroll, pan, or otherwise manipulate the display to gradually (e.g., at an adjustable pace) transition or traverse through multiple different virtual "rooms" of audience users. The presenter can select one or more indicators in each virtual room to engage in private chats or to bring up to be in broadcast mode (e.g., as described above with respect to FIG. 4).

Although FIG. 9A shows categories 910 being presented at the bottom left of screen 900, it should be appreciated that categories 910 can be displayed at any suitable position on screen 900. Moreover, categories 910 can be shown on a different screen, or can only be displayed on screen 900 when the presenter requests the categories to be displayed.

In at least one embodiment, the categories may not be displayed at all times, but can be presented (e.g., as a pop-up) when the number of users in a particular category exceeds a predefined value. FIG. 9B shows various alerts 952 and 954 that can be presented to a presenter on screen 900 when certain conditions are satisfied. For example, the system can show an alert 952 when five or more people have their hands raised simultaneously. As another example, the system can show an alert 954 when over 50% of the audience is not engaged in the event or has stepped away from their respective user devices.

Although not shown, the categories of users can also be displayed to the presenter in the form of a pie chart. For example, each slice of the pie chart can be color-coded to correspond to a particular category, and the size of each slice can indicate the percentage of users in the audience that have been classified in the corresponding category.

In at least one embodiment, the presenter in a multi-user event can send a call-to-action (e.g., a pop-up message or a display change instruction, such as preventing display of content) to members in the audience. This call-to-action can request some form of interaction by the audience, such as completion of a task. That is, a system can provide a presenter with the ability to send a request (e.g., a call-to-action) to one or more of the audience devices for user input or response (e.g., to each of the users in the audience, to pre-selected users in the audience, to users in predefined groups or subgroups, etc.). For example, the presenter can pose a question to the audience, and can request that the system trigger the audience devices to display a response window or otherwise provide a request to the users in the audience (e.g., via a video, etc.). The users in the audience can respond via one or more button presses, voice, gestures, and the like. During a live multi-user web-based event, it can also be advantageous to allow a presenter to employ a call-to-action to restrict or limit a presentation of content on the audience devices, unless or until appropriate or desired action is taken by the audience users. This can allow a presenter to control the audience's ability to participate (or continue to participate) in an event. For example, after providing an introductory free portion of a presentation, the presenter may wish to resume the presentation only for those users who submit payment information. Thus, in at least one embodiment, the system can allow a presenter to set a call-to-action requesting payment information, and can send the request to one or more of the audience devices.

The system can allow the presenter to set a call-to-action in any suitable manner. For example, the system can include an administrative tool or interface (not shown) that a presenter can employ to set the call-to-action (e.g., to set answer choices, vote options, payment information fields, etc.). The system can then send or transmit the call-to-action information to one or more of the audience devices (e.g., over a network to devices 255-258). A corresponding system component in the audience devices can control the audience devices to display or otherwise present the call-to-action information. FIG. 10 is an illustrative call-to-action window 1000 that can be displayed on one or more audience devices. As shown in FIG. 10, window 1000 can include one or more fields or option 1010 requesting user input. For example, fields 1010 can include selection buttons that correspond to "YES" or "NO" answers, or any other answers customizable by a presenter or the audience users. As another example, fields 1010 can include input fields associated with payment information (e.g., credit card information, banking information, etc.). The system can facilitate the sending of any inputs received at each audience device back to the presenter as a response to the call-to-action request.

In at least one embodiment, non-responsive users in the audience (e.g., those who fail to input a desired response to the call-to-action) can lose their ability to participate (or continue to participate) in the event or receive and view presentation content at their respective audience devices. For example, the system can terminate the presentation of content on the audience devices if the corresponding user does not provide payment information (e.g, within a pre-defined time).

In at least one embodiment, the volume of live audio feedback from an audience in a multi-user event (e.g., as detected from the audience's individual microphones) can be analyzed and reported to a presenter of the event. This can, for example, help the presenter gauge audience reaction to his presentation (e.g., loud laughter in response to a joke). In other words, as explained above, a presenter can typically readily identify feedback from an audience during a live in-person presentation or event. For example, during a live comedy event, a comedian can easily determine (in real-time) whether the audience is responding to his jokes with laughter. In contrast, a presenter at a live web-based presentation is typically unable to identify mass audience reactions. Thus, in at least one embodiment, a system can receive feedback, and more particularly, audio feedback, from one or more users in the audience, and can provide this feedback to a presenter in an easily understandable manner.

The system can be implemented as software, and can be resident on either a server (e.g., server 251) or a user device (e.g., device 100 or any of devices 255-258) of the presenter and/or audience devices. The system can be configured to receive one or more media streams from the audience devices (e.g., similar to that described above with respect to FIGS. 9A and 9B), and can analyze these streams to determine audio characteristics. More particularly, the system can be configured to determine any changes in volume level of audio signals received from the audience, patterns of the volume change, and the like. Because one or more participants or users in the audience may have an audio input component (e.g. microphone) and a video capture component (e.g., webcam) active on their respective user devices, the media streams can be a culmination of one or more signals provided by these components. In at least one embodiment, the system can receive the audio portions of the media streams from the audience device, and can analyze the audio signals to determine or identify changes in volume (e.g., by continuously monitoring the audio streams). Any change in volume of the audio signals can indicate to the presenter that the audience (e.g., as a whole, or at least in part) is reacting to the presentation.

The system can monitor the received audio signals and determine changes in volume level in any suitable manner. For example, the system can receive all audio signals from all the audience device, determine an average volume or amplitude of each audio signal, and calculate an overall average volume of the audience by taking another average of all of the determined average volumes. As another example, the system can receive all audio signals, but only use a percentage or portion of the audio signals to determine the overall audience volume. Regardless of the technique employed to determine an overall audience volume, this information can be presented to the presenter as an indication of audience feedback.

Figure 11B:
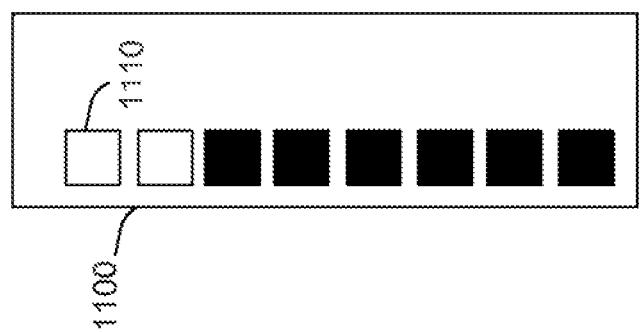
FIGS. 11A and 11B are schematic views of an illustrative audio volume meter representing different overall audience volumes, in accordance with at least one embodiment.
Figure 11A:
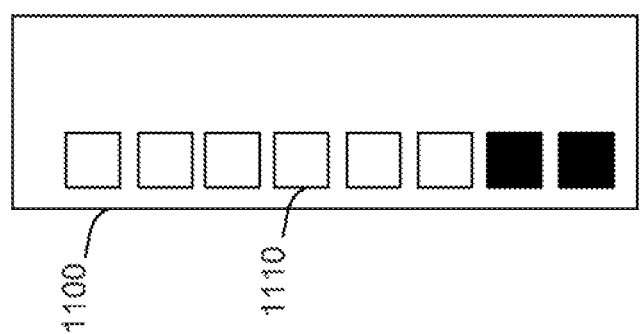

Results of audio stream analyses (e.g., overall audience volume levels) can be provided to the presenter in any suitable manner (e.g., visually, audibly, haptically, etc.). FIGS. 11A and 11B show an audio volume meter 1100 that can be displayed on a presenter device (e.g., as a part of screen 900). Volume meter 1100 can include bars 1110 each representing a level of audio volume of the audience (e.g., where bars higher up in the meter signify a higher overall audience volume). The system can associate a different overall audience volume level with a different bar 1110, and can "fill" that bar, as well as the bars below it as appropriate. For example, the overall audience volume at one moment may be determined to correspond to the second bar 1110 from the bottom up. In this example, the first two bars from the bottom up of volume meter 1100 can be filled as shown in FIG. 11A. As another example, the overall audience volume at another moment may be determined to be high enough to correspond to the sixth bar 1110 from the bottom up. In this example, the first six bars from the bottom up of volume meter 1100 can be filled as shown in FIG. 11B. The change in overall audience volume represented by a simple volume meter (or the relative difference in the overall volume) can allow a presenter to quickly determine whether the audience is reacting to his presentation. Although FIGS. 11A and 11B show audio volume meter 1100 being presented in a vertical configuration, it should be appreciated that an audio volume meter can be presented in any suitable manner (e.g., horizontally, in a circular fashion, etc.), as long as it can convey changes in audio volume level of the audience.

In at least one embodiment, the system (or at least some component of the system) can be provided on each audience device, and can be configured to monitor voice and audio data captured by microphones of the devices. The system can also be configured to determine the volume level of the data. This information can be transmitted from each audience device to a server (e.g., server 251) and/or the presenter device for analysis. The server and/or presenter device can determine if the cumulative audio level of the audience (e.g., the voices of the audience as a whole) is changed. Any such change can be alerted to the presenter, for example, via volume meter 1100. In this manner, the server and the presenter device can be saved from having to evaluate or analyze all of the streams coming from the audience devices.

It should be appreciated that the system can also be leveraged by the presenter for real-time audio polling purposes. For example, the presenter can invoke or encourage participants or users in the audience to answer questions, where any change in the audio level of the audience can represent a particular answer. Continuing with the example, if the presenter asks the audience to answer "YES" if they satisfy a certain condition, any dramatic increase in the audio level can indicate to the presenter that a large part of the audience answered "YES." If the presenter then asks the audience to answer "NO" if they do not satisfy the condition, a less of an increase in the audio level can indicate to the presenter that a smaller portion of the audience answered "NO."

Figure 12:
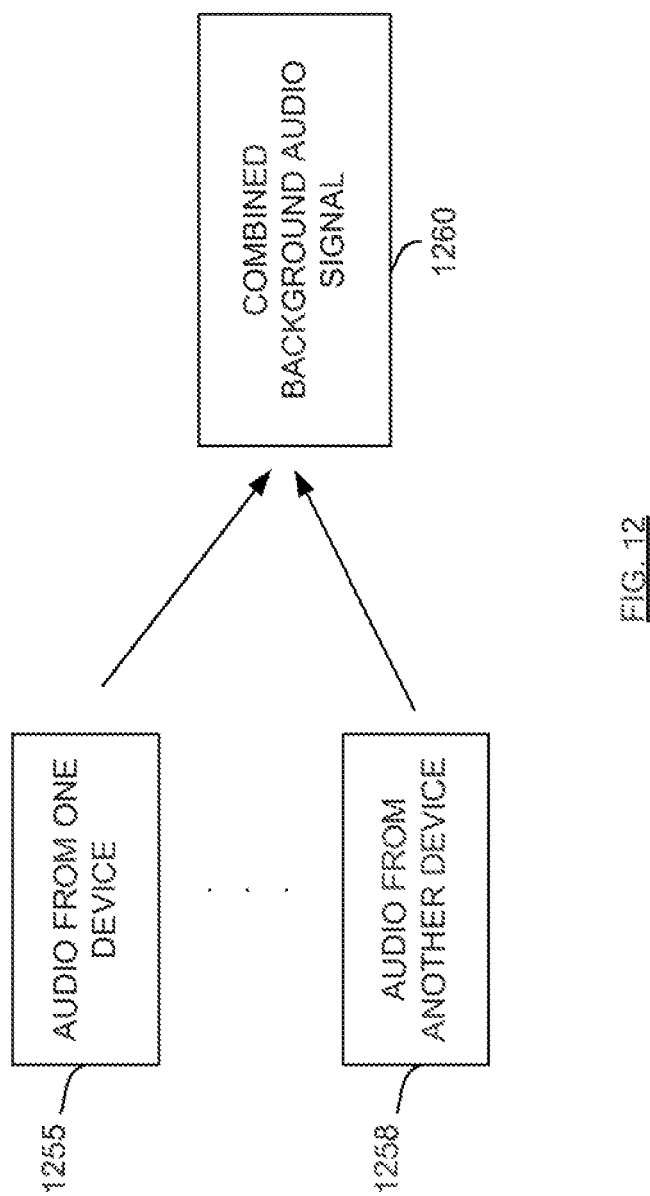
FIG. 12 shows a schematic view of a combination of audio signals from multiple audience devices, in accordance with at least one embodiment.

In at least one embodiment, live audio captured by the microphones of one or more members in the audience can be combined to generate a background audio signal. This background signal can be provided to the presenter as well as each member in the audience to simulate noise of an actual crowd of people. That is, during a live in-person event, any noise emitted by one or more people in the audience can be heard by the presenter, as well as by others in the audience. It can be advantageous to provide a similar environment in a multi-user web-based event. Thus, in at least one embodiment, a system can receive audio signals from one or more audience devices (e.g., similar to user device 100 or any of devices 255-258), and can combine the received audio signals to generate a "crowd" or background audio signal. The system can receive audio signals from all of the audience devices. Alternatively, the system can receive audio signals from a predefined percentage of the audience devices. The combined audio can be transmitted to each of the audience devices so as to simulate a live in-person event with background noise from the overall audience. FIG. 12 shows a schematic view of a combination of audio signals from multiple audience devices. As shown in FIG. 12, a system can receive audio signals 1255-1258 (e.g., from one or more user devices 255-258), and can combine the received audio signals to provide a combined background audio signal 1260.

The system can reside in one or more of a presenter device (e.g., similar to the presenter device described above with respect to FIGS. 9A and 9B) and a server (e.g., server 251). Background audio signal 1260 can be provided to each of the audience devices, as well as to the presenter device. In this manner, all of those present in the event can experience a simulated crowd environment similar to that of a live in-person event.

The system can combine the received audio in any suitable manner. For example, the received audio signals can be superimposed using known audio processing techniques. The system can also combine audio signals or streams from the presenter device along with the audio signals from the audience devices prior to transmission of signal 1260 to the audience devices. In this manner, the audience devices can receive presentation data (e.g., audio, video, etc.) from the presenter device, as well as overall crowd background audio.

Moreover, the system can process each received audio signal prior to, during, or after the combination. For example, each received audio signal can be processed prior to combination in order to eliminate any undesired extraneous noise. Continuing with the example, the system can be configured to analyze the received audio signals, and can be configured to only consider or combine components of the audio signals that exceed a predefined threshold or volume level. As another example, the audio signals can be processed during combination such that some audio signals may have a higher amplitude than other audio signals. This may simulate spatial audio effects (where, for example, noise from a user located closer to the presenter may be louder than noise from a user located farther away). The determination of whether one audio signal should have a higher amplitude than another can be made based on any suitable factor (e.g., the real-life distance between the presenter device and the user device outputting that audio signal, etc.).

In at least one embodiment, the presenter in a multi-user event can allow participants or members in the audience to play, pause, or otherwise manipulate the content being presented. During a web-based multi-user event, content being presented is typically streamed from the presenter device to audience devices, and the presenter is usually in exclusive control of the presentation of the content, even when displayed or presented at the audience devices. For example, if the presenter is presenting a video, the presenter can typically rewind, fast-forward, and pause the video and the same effects can be observed or reflected at the audience devices. However, it can be desirable to provide those in the audience with at least limited control of the presentation content on their respective user devices. That is, it can be advantageous to allow users in the audience to rewind, fast-forward, or otherwise manipulate the presentation content on their own devices. Thus, in at least one embodiment, a system can provide users in an audience with the ability to control, or otherwise manipulate content currently being streamed or presented to their devices. The system can also provide a presenter with the ability to control whether or not (or when) those in audience can control the content at their respective devices. In this way, an audience can experience at least some freedom in controlling presentation content on their own devices.

Figure 13:
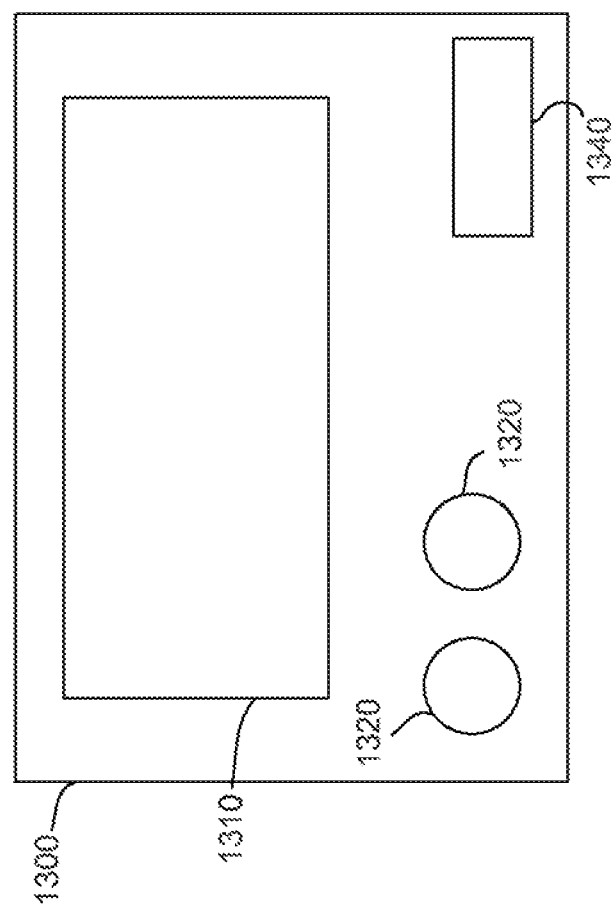
FIG. 13 is a schematic view of an illustrative display screen that allows a presenter of a multi-user event to control the ability of audience devices to manipulate content presented to the audience devices, in accordance with at least one embodiment.

The system can be embodied as software, and can be configured to generate control signals for allowing or preventing the audience devices from manipulating content being presented. FIG. 13 shows an illustrative presenter screen 1300 that allows a presenter to control the ability of audience devices to manipulate presented content. As shown in FIG. 13, screen 1300 can display content 1310 (e.g., a slideshow, a video, or any other type of content) that is currently being presented by the presenter to audience devices. Screen 1300 can include one or more input mechanisms 1320 that the presenter can select to control, or otherwise manipulate the presentation of content 1310 that is being transmitted to the audience devices. For example, input mechanisms 1320 can include one or more of a rewind, a fast-forward, a pause, and a play mechanism for controlling the presentation of content 1310. In at least one embodiment, the audience devices can also include a screen that is similar to screen 1300. For example, the screen can include input mechanisms similar to input mechanisms 1320 that can allow audience users to manipulate the presentation content (e.g., play, pause, rewind, and fast-forward buttons of a multimedia player application that can receive and be controlled by the aforementioned control signals generated by the system).

To allow the presenter to set whether those in the audience can control or manipulate content 1310 that has been transmitted to the respective audience devices, screen 1300 can also include an audience privilege setting feature. The audience privilege setting feature can provide various types of functionality that allows the presenter to control the ability of the audience to manipulate presented content on their respective devices. More particularly, audience privilege setting feature can include one or more settings or buttons 1340 (or other similar types of inputs) each for configuring the system to control the ability of the audience to manipulate the content in a respective manner. When any of these settings or buttons 1340 are selected (e.g., by a presenter), the system can generate the corresponding control signals to control the audience devices. For example, one setting 1340 can correspond to one or more control signals for allowing the audience devices to rewind the presented content. As another example, another setting 1340 can correspond to one or more control signals for allowing the audience devices to fast-forward the presented content. As yet another example, yet another setting 1340 can correspond to one or more control signals for only allowing the audience devices to rewind, but not fast-forward the presented content. As still another example, another setting 1340 can correspond to one or more control signals for allowing the audience devices to either rewind or fast-forward the presented content, whenever the presenter pauses the presentation on the presenter device. As yet another example, another setting 1340 can correspond to one or more control signals for causing the audience devices to resets the play position of presentation content on the devices, whenever the presenter resumes the presentation on the presenter device. In this example, the presentation can resume for all audience devices at a common junction, even if the audience devices may have rewound or fast-forwarded the content.

As described above, the system can provide the aforementioned functionalities, and the like, in the form of software and control signals. When the presenter sets the audience privilege setting feature (e.g., to prevent fast-forwarding of the presentation by the audience devices), the control signals can be embedded or otherwise transmitted along with content 1310 to the respective audience devices, and can be processed by the audience devices (e.g., to prevent fast-forwarding of the received content).

Although FIG. 13 shows input mechanisms 1320 and audience privilege settings 1340 being included in screen 1300, it should be appreciated they can be provided in any suitable manner. For example, they can be provided as buttons that are separate from screen 1300 (e.g., separate buttons of the device). As another example, they can be provided as voice control functions (e.g., the presentation of the content can be rewound, fast-forwarded, and the like, via one or more voice commands from the presenter).

It should be appreciated that, although the system has been described above as allowing a presenter to limit presentation manipulation by all users in the audience, the system can also allow the presenter to apply the content manipulation limitations only to some users in the audience. For example, the system can allow the presenter to apply content manipulation limitations only to certain users selected by the presenter.

It should also be appreciated that, although the system has been described above as streaming, transmitting, or otherwise presenting content 1310 from the presenter device to the audience devices, the system can additionally, or alternatively, facilitate the streaming, transmitting, or presenting of content from an external device (e.g., a remote server, such as server 251 or any other data server) to the audience devices. Moreover, the system can still be configured to employ the audience privilege setting feature to control the ability of the audience devices to manipulate the presented content, even if the content is not being provided directly by or from the presenter device. Additionally, it should be appreciated that the content does not have to be streamed during the presentation. For example, the content can be previously transmitted (e.g., downloaded) to each of the audience devices before the event, and can be accessible to the audience when the event begins. Moreover, even in this case, the system can still be configured to employ the audience privilege setting feature to control the ability of the audience devices to manipulate the previously downloaded content (e.g., by controlling a corresponding system component on each of the audience devices to seize control of any multimedia player applications of the audience devices that may be used to play or execute the content).

Figure 14:
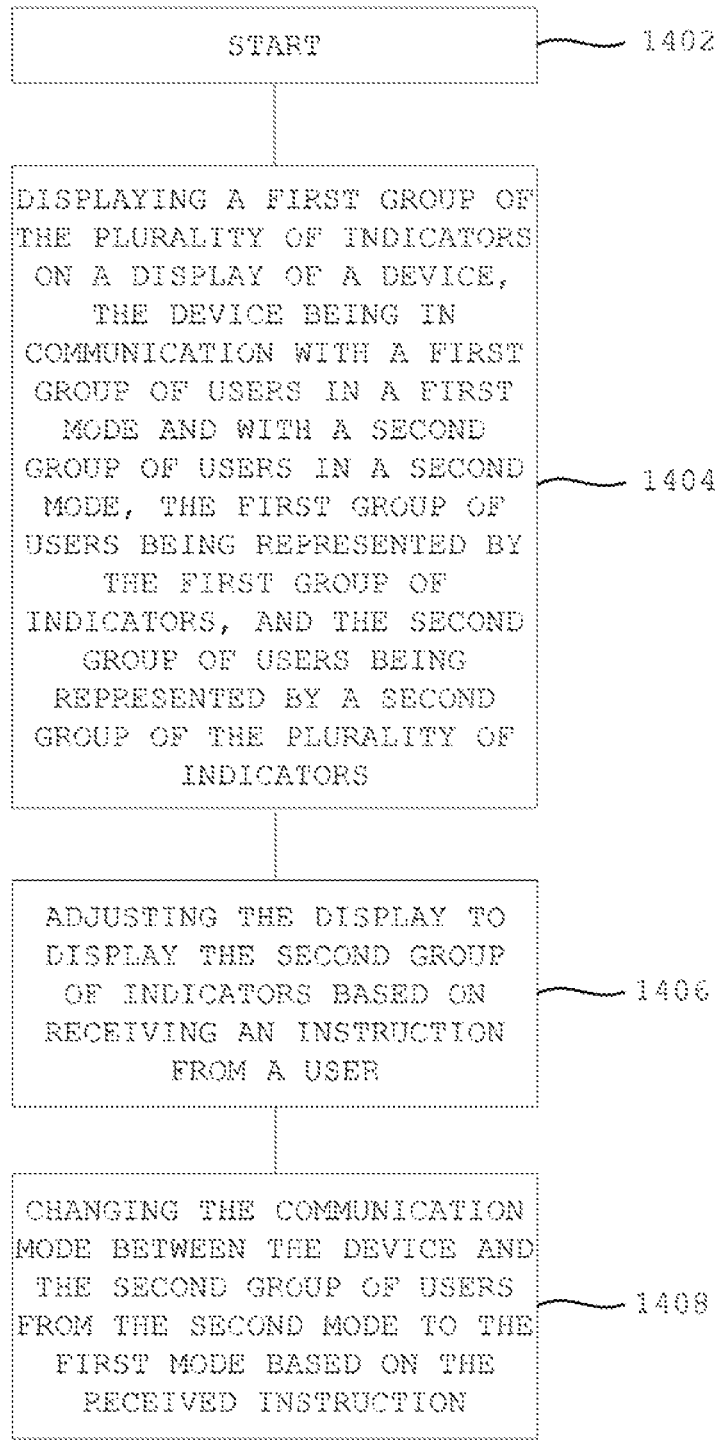
FIG. 14 is an illustrative process for displaying a plurality of indicators, the plurality of indicators each representing a respective user, in accordance with at least one embodiment.

FIG. 14 is an illustrative process 1400 for displaying a plurality of indicators, the plurality of indicators each representing a respective user. Process 1400 can begin at step 1402. At step 1404, process 1400 can include displaying a first group of the plurality of indicators on a display of a device, where the device is in communication with a first group of users in a first mode and with a second group of users in a second mode, and where the first group of users is represented by the first group of indicators, and the second group of users is represented by a second group of the plurality of indicators. For example, process 1400 can include displaying a first group of users including users 3 and 4 on screen 700 of FIG. 7A. The device can be in an intermediate communication mode with users 3 and 4.

Moreover, the device can also be in an instant ready-on communication mode with a second group of users including user 7 of FIG. 7A.

At step 1406, process 1400 can include adjusting the display to display the second group of indicators based on receiving an instruction from a user. For example, process 1400 can include adjusting screen 700 to display the second group of users including user 7, as shown in FIG. 7B, based on receiving a user instruction at the device to adjust screen 700. The user instruction can include a scroll, a pan, or other manipulation of screen 700 or the device. Moreover, process 1400 can include removing at least one user of the first group of users from a display area of the display. For example, process 1400 can include removing user 3 of the first group of users from a display area of screen 700 (e.g., as shown in FIG. 7B).

At step 1408, process 1400 can include changing the communication mode between the device and the second group of users from the second mode to the first mode based on the received instruction. For example, process 1400 can include changing the communication mode between the device and the device of user 7 from the instant ready-on mode to the intermediate mode.

In at least one embodiment, process 1400 can also include changing the communication mode between the device and at least one user of the first group of users from the first mode to the second mode. For example, process 1400 can include changing the communication mode between the device and user 3 from the intermediate mode to the instant ready-on mode.

Figure 15:
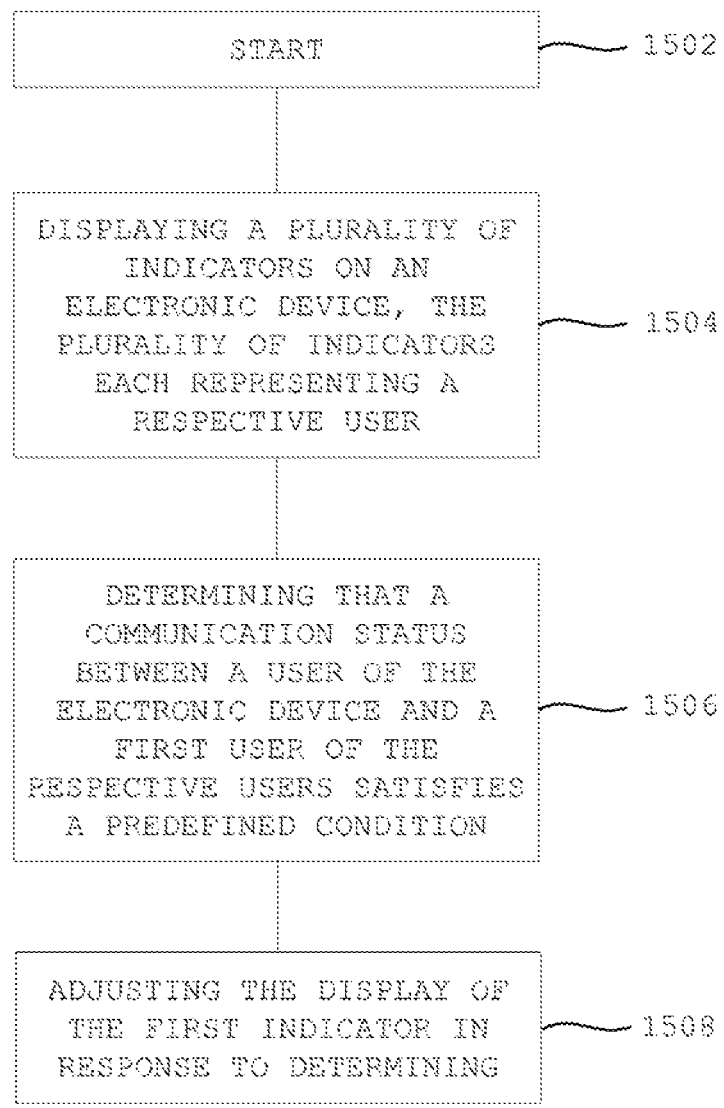
FIG. 15 is an illustrative process for manipulating a display of a plurality of indicators, in accordance with at least one embodiment.

FIG. 15 is an illustrative process 1500 for manipulating a display of a plurality of indicators. Process 1500 can begin at step 1502. At step 1504, process 1500 can include displaying a plurality of indicators on an electronic device, where the plurality of indicators each represents a respective user. For example, process 1500 can include displaying a plurality of indicators, as shown in FIG. 7D.

At step 1506, process 1500 can include determining that a communication status between a user of the electronic device and a first user of the respective users satisfies a predefined condition. For example, process 1500 can include determining that a communication status between user 1 and user 3 satisfies a predefined condition. The predefined condition can include a request being received from user 1 to initiate communications with user 3 (e.g., a user selection of indicator 3). The predefined condition can additionally, or alternatively, include information regarding a recent or previous communication between users 1 and 3 (e.g., stored data indicating that users 1 and 3 have recently communicated with one another).

At step 1508, process 1500 can include adjusting the display of the first indicator in response to determining. As one example, a previous step 1502 can include at least partially overlaying indicator 9 on indicator 3, as shown in FIG. 7D. In this example, step 1508 can include switching the overlaying by overlaying indicator 3 on indicator 9. As another example, a previous step 1502 can include displaying indicator 3 at a first size. In this example, step 1508 can include displaying indicator 3 at a different size (e.g., a larger size similar to that of indicator 4 of FIG. 7D). As yet another example, a previous step 1502 can include displaying an indicator of the user of the electronic device (e.g., indicator 1 of FIG. 7D), and displaying indicator 3 away from indicator 1. In this example, step 1508 can include displacing or moving indicator 3 towards indicator 1. More particularly, indicator 3 can be displaced, or otherwise moved towards indicator 1 such that indicators 1 and 3 form a pair (e.g., similar to the pairing of indicators 1 and 2, as shown in FIGS. 7A-7C).

Figure 16:
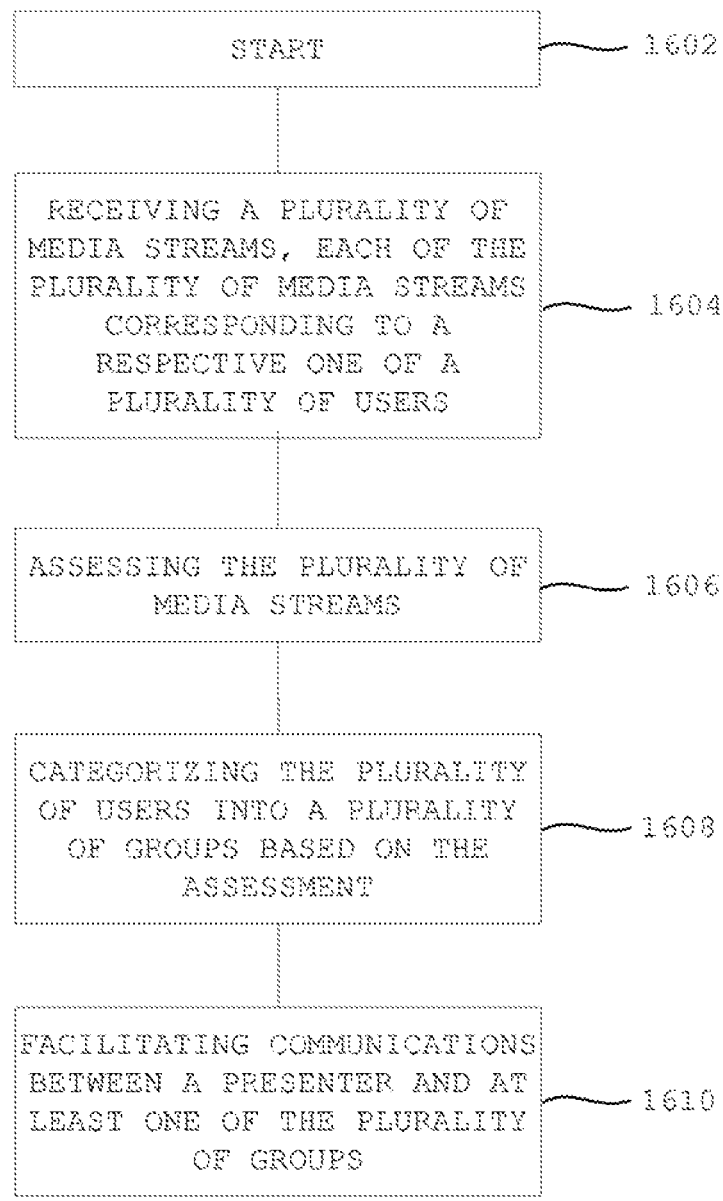
FIG. 16 is an illustrative process for dynamically evaluating and categorizing a plurality of users in a multi-user event, in accordance with at least one embodiment.

FIG. 16 is an illustrative process 1600 for dynamically evaluating and categorizing a plurality of users in a multi-user event. Process 1600 can begin at step 1602. At step 1604, process 1600 can include receiving a plurality of media streams, where each of the plurality of media streams corresponds to a respective one of the plurality of users. For example, process 1600 can include receiving a plurality of video and/or audio streams that each corresponds to a respective user and user device (e.g., user device 100 or any of user devices 255-258).

At step 1606, process 1600 can include assessing the plurality of media streams. For example, process 1600 can include analyzing the video or audio streams. This analysis can be performed using any video or audio analysis algorithm or technique, as described above with respect to FIG. 9.

At step 1608, process 1600 can include categorizing the plurality of users into a plurality of groups based on the assessment. For example, process 1600 can include categorizing the plurality of users into a plurality of groups or categories 910 based on the analysis of the video and/or audio streams. The users can be categorized based on their behavior (e.g., raising of hands, being inattentive, having stepped away, etc.), or any other characteristic they may be associated with (e.g., lefties, languages spoken, school attended, etc.). In at least one embodiment, process 1600 can also include providing the categorization to a presenter of the multi-user event. For example, process 1600 can include providing the categorization information on the plurality of users, as described above with respect to FIG. 9.

At step 1610, process 1600 can include facilitating communications between a presenter and at least one of the plurality of groups. For example, process 1600 can include facilitating communications between the presenter device and at least one of the plurality of categorized groups, as described above with respect to FIG. 9.

Figure 17:
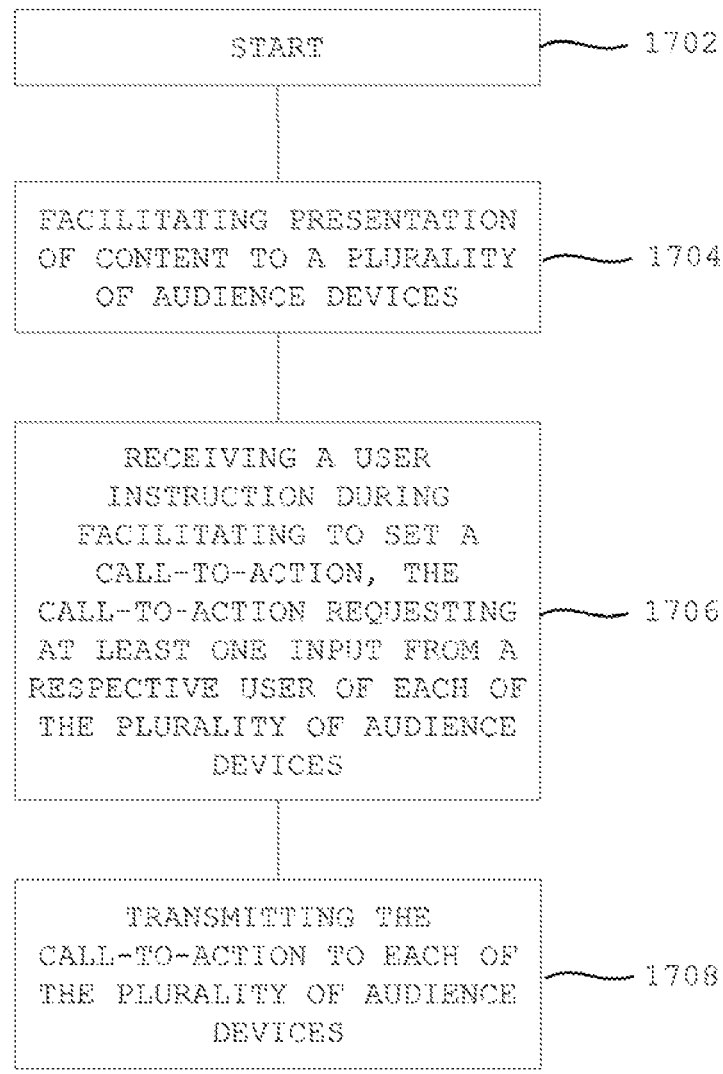
FIG. 17 is an illustrative process 1700 for providing a call-to-action to an audience in a multi-user event, in accordance with at least one embodiment.

FIG. 17 is an illustrative process 1700 for providing a call-to-action to an audience in a multi-user event. Process 1700 can begin at step 1702. At step 1704, process 1700 can include facilitating presentation of content to a plurality of audience devices. For example, process 1700 can include presenting content from a presenting device to a plurality of audience devices (e.g., as described above with respect to FIGS. 9A, 9B, and 10).

At step 1706, process 1700 can include receiving a user instruction during facilitating to set a call-to-action, where the call-to-action requests at least one input from a respective user of each of the plurality of audience devices. For example, process 1700 can include, during facilitating presentation of the content to the audience devices, receiving a user instruction from a presenter of the presenter device to set a call-to-action via an administrative tool or interface, as described above with respect to FIG. 10.

At step 1708, process 1700 can include transmitting the call-to-action to each of the plurality of audience devices. The call-to-action can be presented to the audience users in the form of a response window displayed on each of the audience devices (e.g., window 1000), and can include one or more requests (e.g., fields 1010) for inputs from the respective users of the audience devices.

Process 1700 can also include restricting facilitating in response to receiving the user instruction. For example, process 1700 can include restricting the presentation of the content at one or more of the audience devices when the user instruction from the presenter is received. In this manner, the audience devices can be restricted from displaying or otherwise providing the presented content to the respective users, until those users perform an appropriate action (e.g., answer a proposed question, cast a vote, enter payment information, etc.).

In at least one embodiment, process 1700 can also include receiving the at least one input from at least one user of the respective users. For example, process 1700 can include receiving inputs at fields 1010 from one or more users in the audience. Process 1700 can also include resuming facilitating on the audience devices whose users responded to the call-to-action. For example, process 1700 can include resuming the facilitation of the content on those audience devices whose users suitably or appropriately responded to the call-to-action.

Figure 18:
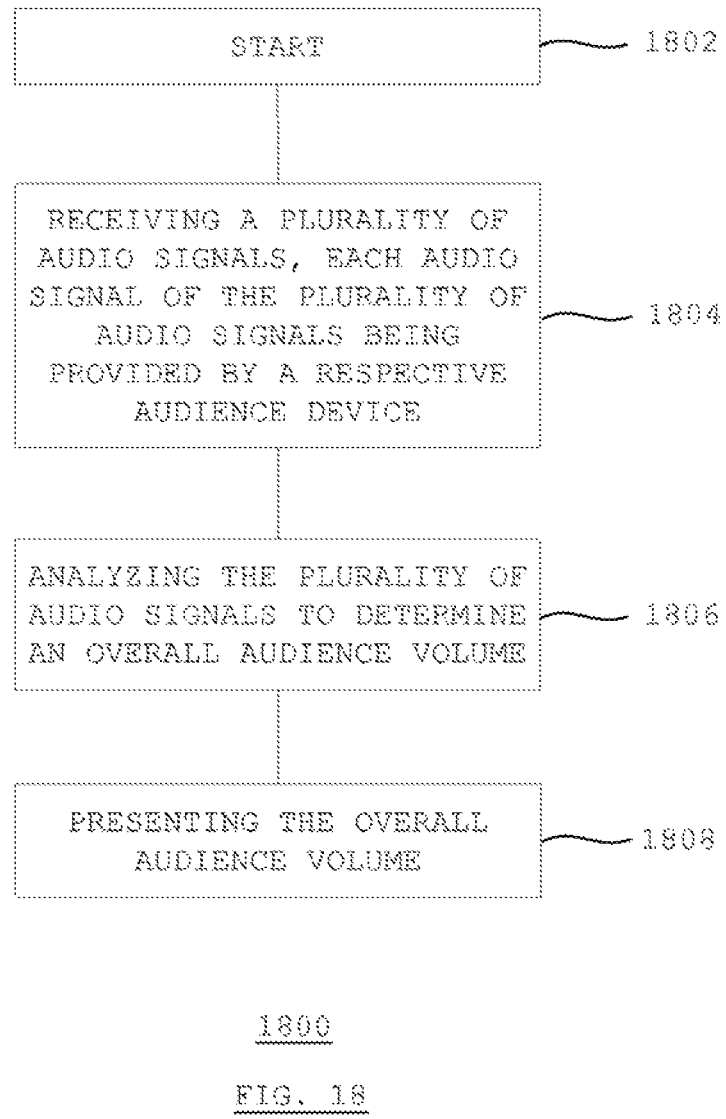
FIG. 18 is an illustrative process for detecting audience feedback, in accordance with at least one embodiment.

FIG. 18 is an illustrative process 1800 for detecting audience feedback. Process 1800 can begin at step 1802. At step 1804, process 1800 can include receiving a plurality of audio signals, where each audio signal of the plurality of audio signals is provided by a respective audience device. For example, process 1800 can include receiving a plurality of audio signals provided by respective audience devices, as described above with respect to FIGS. 11A and 11B.

At step 1806, process 1800 can include analyzing the plurality of audio signals to determine an overall audience volume. For example, process 1800 can include analyzing the plurality of audio signals to determine an overall audience volume, as described above with respect to FIGS. 11A and 11B. This analysis can include taking averages of amplitudes of the audio signals, and the like.

At step 1808, process 1800 can include presenting the overall audience volume. For example, process 1800 can include presenting the overall audience volume to a presenter device in the form of a volume meter, such as volume meter 1100 of FIGS. 11A and 11B.

In at least one embodiment, process 1800 can also include monitoring the plurality of audio signals to identify a change in the overall audience volume. For example, process 1800 can include monitoring the plurality of audio signals to identify an increase or a decrease in the overall audience volume. Process 1800 can also include presenting the changed overall audience volume. In at least one embodiment, process 1800 can only identify changes in the overall audience volume if the change exceeds a predetermined threshold (e.g., if the change in overall audience volume increases or decreases by more than a predetermined amount).

In at least one embodiment, the various steps of process 1800 can be performed by one or more of a presenter device, audience devices, and a server (e.g., server 251) that interconnects the presenter device with the audience devices.

Figure 19:
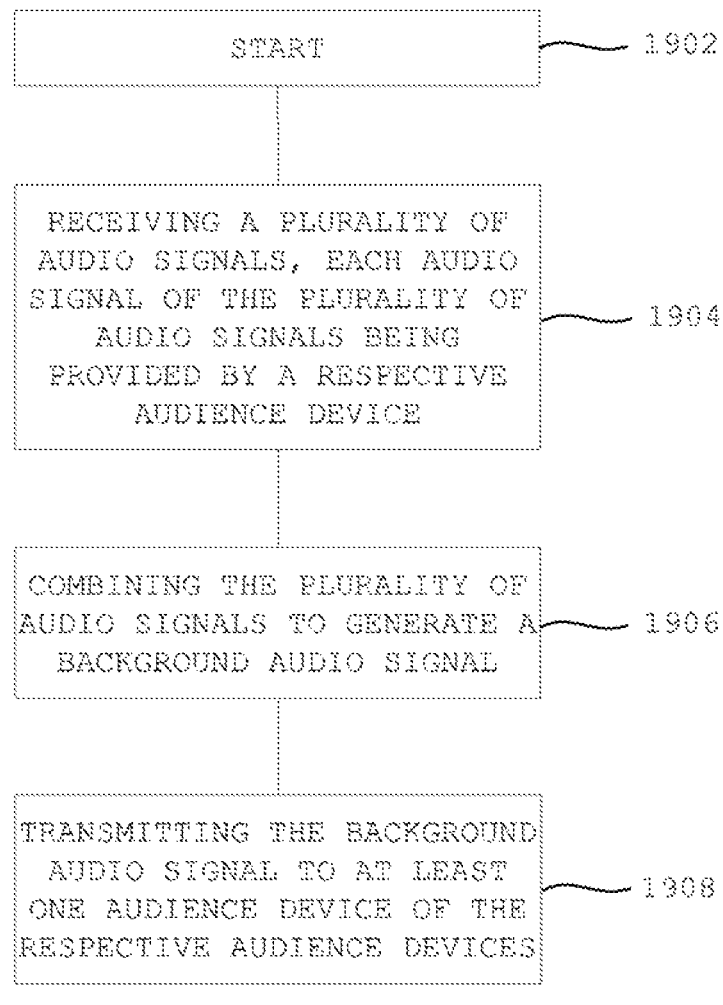
FIG. 19 is an illustrative process for providing a background audio signal to an audience of users in a multi-user event, in accordance with at least one embodiment.

FIG. 19 is an illustrative process 1900 for providing a background audio signal to an audience of users in a multi-user event. Process 1900 can begin at step 1902. At step 1904, process 1900 can include receiving a plurality of audio signals, where each audio signal of the plurality of audio signals is provided by a respective audience device. For example, process 1900 can include receiving a plurality of audio signals provided by respective audience devices, as described above with respect to FIG. 12.

At step 1906, process 1900 can include combining the plurality of audio signals to generate the background audio signal. For example, process 1900 can include combining audio signals 1255-1258 to generate background audio signal 1260. As described above with respect to FIG. 12, audio signals 1255-1258 can be combined using any suitable audio process technique (e.g., superimposition, etc.).

At step 1908, process 1900 can include transmitting the background audio signal to at least one audience device of the respective audience devices. For example, process 1900 can include transmitting background audio signal 1260 to at least one audience device of the respective audience devices. In at least one embodiment, prior to the transmitting, process 1900 can also include combining output data from a presenter device with the background audio signal. For example, as described above with respect to FIG. 12, prior to transmitting background audio signal 1260, background audio signal 120 can be combined with video or audio data from a presenter device.

Figure 20:
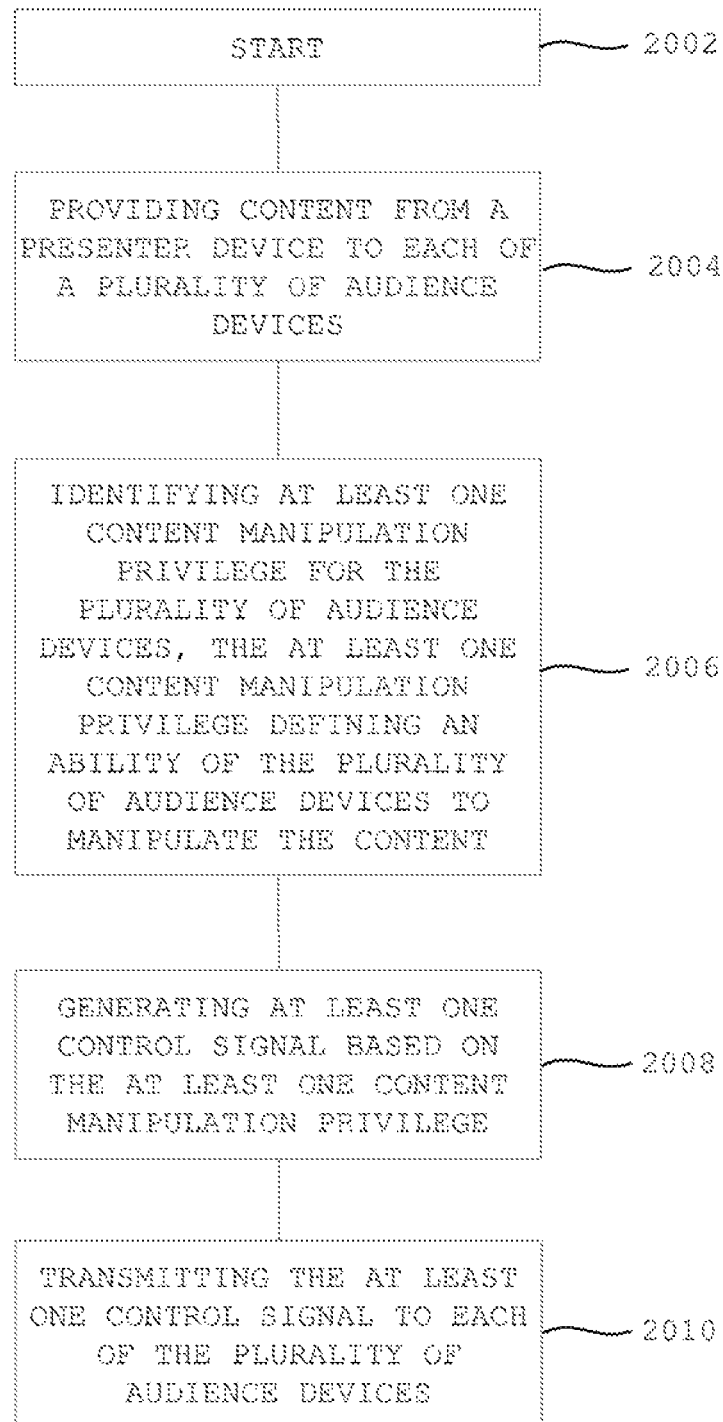
FIG. 20 is an illustrative process for controlling content manipulation privileges of an audience in a multi-user event, in accordance with at least one embodiment.

FIG. 20 is an illustrative process 2000 for controlling content manipulation privileges of an audience in a multi-user event. Process 2000 can begin at step 2002. At step 2004, process 2000 can include providing content to each of a plurality of audience devices. For example, process 2000 can include providing content 1310 from a presenter device to each of a plurality of audience devices (e.g., user device 100 or any of user devices 255-258).

At step 2006, process 2000 can include identifying at least one content manipulation privilege for the plurality of audience devices, where the at least one content manipulation privilege defines an ability of the plurality of audience devices to manipulate the content. For example, process 2000 can include identifying at least one content manipulation privilege that can be set by a presenter of the presenter device (e.g., via the audience privilege setting feature described above with respect to FIG. 13). The content manipulation privilege can define an ability of the audience devices to manipulate (e.g., rewind or fast-forward) content 1310 that is being streamed or presented (or that has been downloaded) to the audience devices.

At step 2008, process 2000 can include generating at least one control signal based on the at least one content manipulation privilege. For example, process 2000 can include generating at least one control signal based on the at least one content manipulation privilege set by the presenter at the presenter device. [0165] At step 2010, process 2000 can include transmitting the at least one control signal to each of the plurality of audience devices. For example, process 2000 can include transmitting the at least one control signal from the presenter device (or from a server) to one or more of the audience devices. Moreover, the control signals can be transmitted during providing of the content. For example, the control signals can be transmitted while the presenter device (or other data server) is presenting or providing content 1310 to the audience devices.

It should be appreciated that the various embodiments described above can be implemented by software, but can also be implemented in hardware or a combination of hardware and software. The various systems described above can also be embodied as computer readable code on a computer readable medium. The computer readable medium can be any data storage device that can store data, and that can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments are presented for purposes of illustration only, and not of limitation.

What is claimed is:

1. A method for dynamically categorizing a plurality of users in a multi-user event who are each utilizing one of a plurality of user devices, the method comprising:
   Receiving, at each user device, a plurality of media streams, each of the plurality of media streams corresponding to a respective one of the plurality of users;
   Assessing, at each user device, the plurality of media streams;
   Categorizing, at each user device, the plurality of users into a plurality of groups based on the assessment;
   reporting, from each user device, categorized information to a server or a presenter of the multi-user event; and
   facilitating, at each user device, communications between the presenter and at least one of the plurality of groups.

2. The method of claim 1, wherein each of the plurality of media streams comprises at least one of an audio stream and a video stream.

3. The method of claim 1, wherein assessing comprises:
   performing an audio analysis on the plurality of media streams.

4. The method of claim 1, wherein assessing comprises:
   performing a video analysis on the plurality of media streams.

5. The method of claim 1, wherein assessing comprises:
   performing at least one of a facial recognition and a gesture recognition analysis on the plurality of media streams.

6. The method of claim 1, wherein each group of the plurality of groups corresponds to at least one predefined behavior.

7. The method of claim 6, wherein the at least one predefined behavior comprises:
   at least one of: raising of hands, being inattentive, having stepped away, and engaging in a chat.

8. The method of claim 1, further comprising:
   receiving a user selection of a first group of the categorized groups; and
   initiating communications between the presenter and at least one user categorized in the first group.

9. A system for dynamically categorizing a plurality of users in a multi-user event, who are each utilizing one of a plurality of user devices, the system comprising:
   a receiver configured to receive a plurality of media streams, each of the plurality of media streams corresponding to a respective one of the plurality of users; and
   a processor configured to:
   assess, at each user device, the plurality of media streams;
   categorize, at each user device, the plurality of users into a plurality of groups based on the assessment;
   report, from each user device, categorized information to a server or a presenter of the multi-user event; and
   facilitate, at each user device, communications between the presenter and each of the plurality of groups.

10. The system of claim 9, wherein each of the plurality of media streams comprises at least one of an audio stream and a video stream.

11. The system of claim 9, wherein the processor is configured to assess the plurality of media streams by performing an audio analysis on the plurality of media streams.

12. The system of claim 9, wherein the processor is configured to assess the plurality of media streams by performing a video analysis on the plurality of media streams.

13. The system of claim 9, wherein the processor is configured to assess the plurality of media streams by performing at least one of a facial recognition and a gesture recognition analysis on the plurality of media streams.

14. The system of claim 9, wherein each group of the plurality of groups corresponds to at least one predefined behavior.

15. The system of claim 14, wherein the at least one predefined behavior comprises at least one of:
   raising of hands, being inattentive, having stepped away, and engaging in a chat.

16. The system of claim 9 further comprising a communications component configured to communicate with external devices, wherein the processor is further configured to:
   detect a user selection of a first group of the categorized groups; and
   direct the communications component to initiate communications between the presenter and at least one user categorized in the first group.

* * * * *